(12) United States Patent
Miwa et al.

(10) Patent No.: US 6,946,679 B2
(45) Date of Patent: Sep. 20, 2005

(54) LIQUID CRYSTAL DISPLAY DEVICE, MANUFACTURING METHOD THEREFOR, AND ELECTRONIC APPARATUS

(75) Inventors: Naonori Miwa, Matsumoto (JP); Keiji Takizawa, Hotaka-machi (JP); Takeyoshi Ushiki, Shiojiri (JP); Yoshio Yamaguchi, Matsumoto (JP)

(73) Assignee: Seiko Epson Corporation (JP)

( * ) Notice: Subject to any disclaimer, the term of this patent is extended or adjusted under 35 U.S.C. 154(b) by 643 days.

(21) Appl. No.: 09/936,742

(22) PCT Filed: Jan. 4, 2001

(86) PCT No.: PCT/JP01/00007

§ 371 (c)(1),
(2), (4) Date: Sep. 13, 2001

(87) PCT Pub. No.: WO01/51985

PCT Pub. Date: Jul. 19, 2001

(65) Prior Publication Data

US 2002/0135715 A1 Sep. 26, 2002

(30) Foreign Application Priority Data

Jan. 13, 2000 (JP) ........................................ 2000-004627

(51) Int. Cl.$^7$ .............................................. H01L 29/04
(52) U.S. Cl. ............................. 257/59; 257/57; 257/72; 257/83; 257/257; 257/290; 257/347; 257/351
(58) Field of Search ............................. 257/57, 59, 72, 257/83, 257, 290, 347, 351

(56) References Cited

U.S. PATENT DOCUMENTS 5,532,854 A * 7/1996 Fergason .................... 349/200
5,805,252 A * 9/1998 Shimada et al. ............. 349/113
6,812,978 B2 * 11/2004 Kim et al. ................... 349/106

FOREIGN PATENT DOCUMENTS

| JP | 54-037697 | 3/1979 |
|----|-----------|--------|
| JP | 01-239528 | 9/1989 |
| JP | 04-141623 | 5/1992 |
| JP | 04212931 | 8/1992 |
| JP | 06-167715 | 6/1994 |
| JP | 08160462 A | 6/1996 |
| JP | 11167107 A | 6/1999 |
| JP | 11337931 A | 12/1999 |
| JP | 2000-352710 | 12/2000 |

OTHER PUBLICATIONS

Communication from Japanese Patent Office regarding counterpart application.

* cited by examiner

*Primary Examiner*—Long Pham
*Assistant Examiner*—Wai-Sing Louie
(74) *Attorney, Agent, or Firm*—Harness, Dickey & Pierce, P.L.C.

(57) ABSTRACT

A liquid crystal display device comprises a pair of substrates (11, 12) bonded to each other by a sealing material (13) in the form of a frame provided therebetween, liquid crystal (14) held between the pair of substrates; a reflective layer (111) formed on one (11) of the substrates, and an alignment film (116) formed over the reflective layer (111) at the liquid crystal side. The surface of said one (11) of the substrates has a roughened area (11b) which is roughened and a flat area (11a) which is flat and surrounds the roughened area (11b). The alignment film (116) is formed in the roughened area (11b), and the sealing material (13) is formed in the flat area (11a).

16 Claims, 16 Drawing Sheets

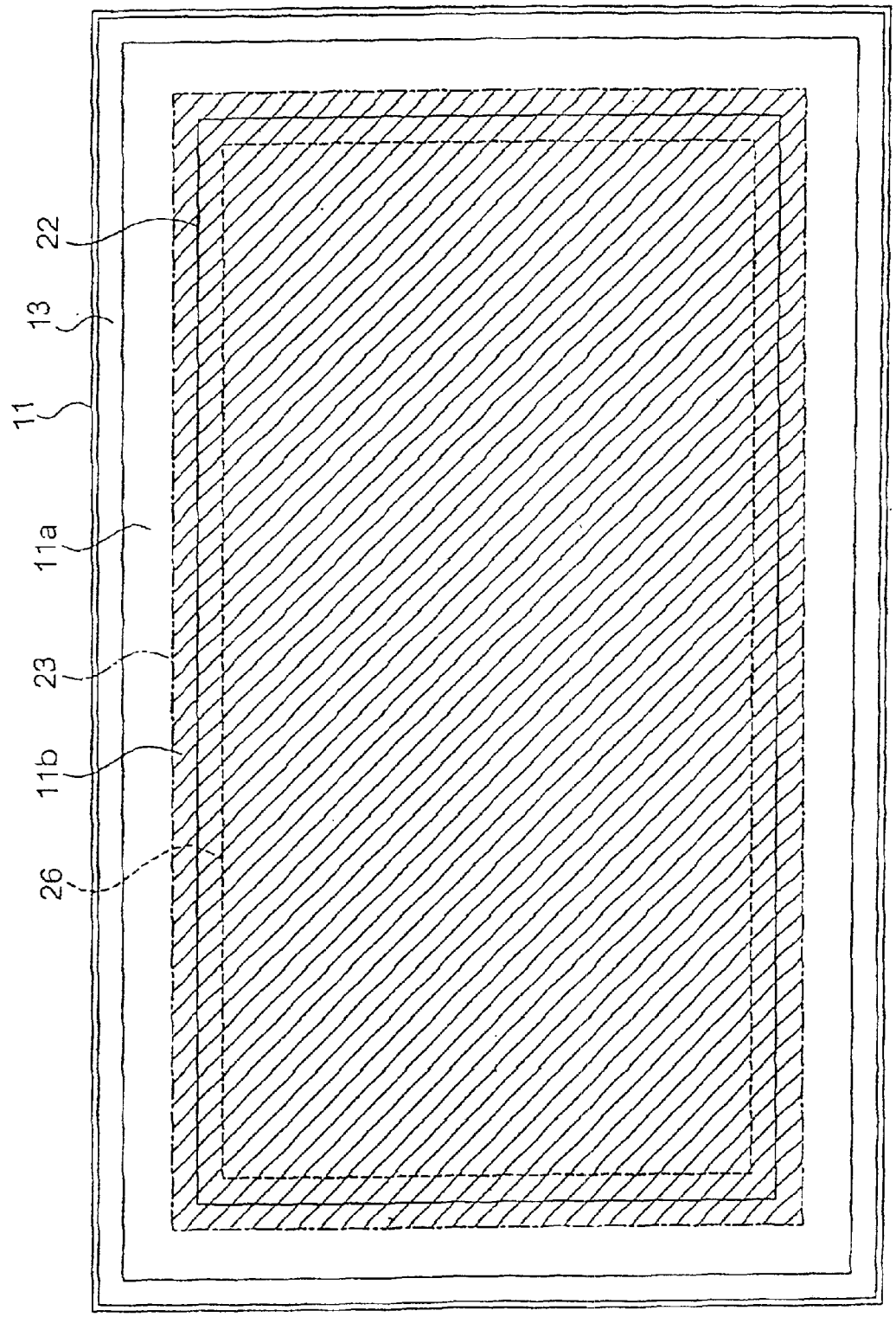

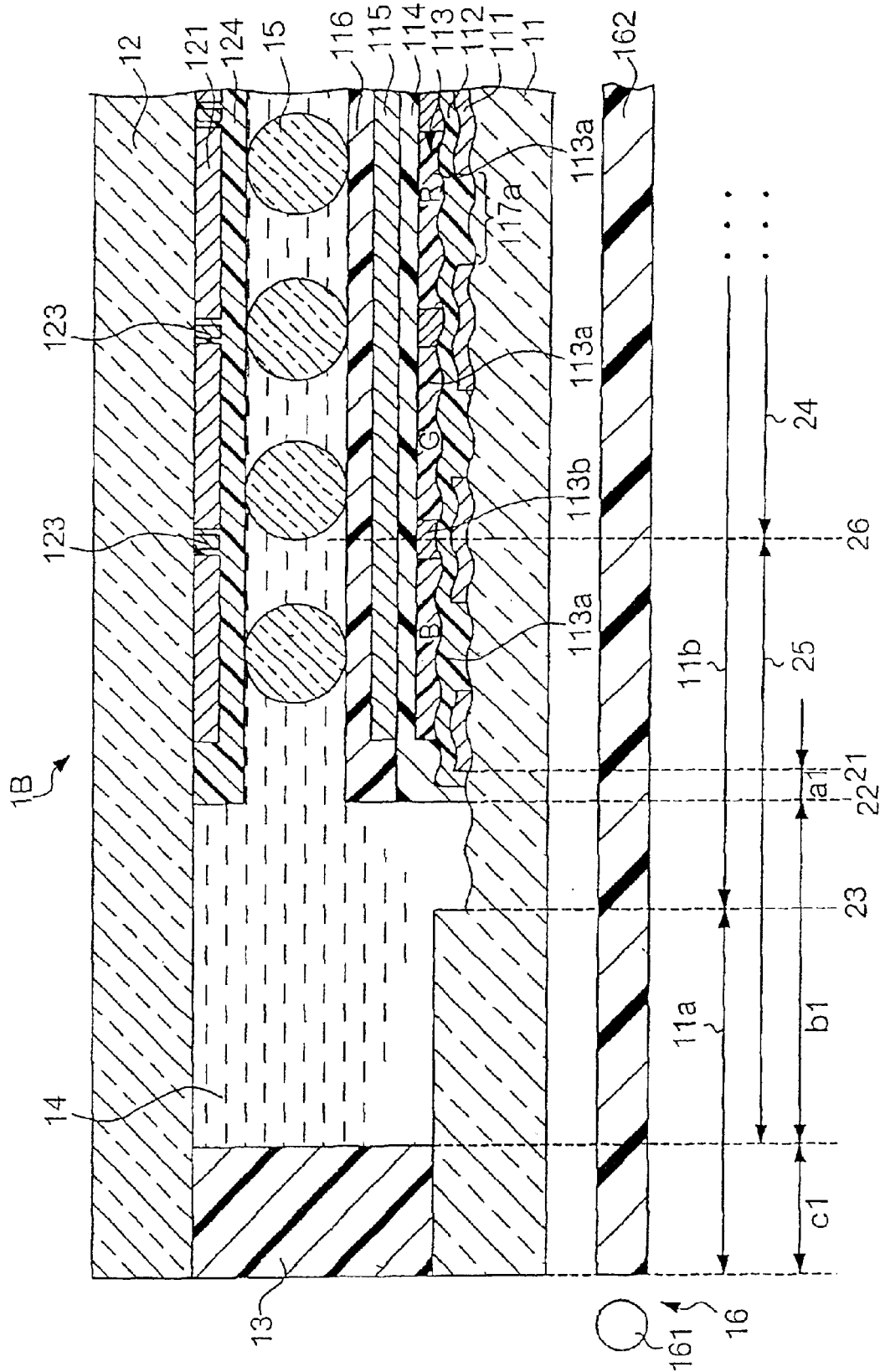

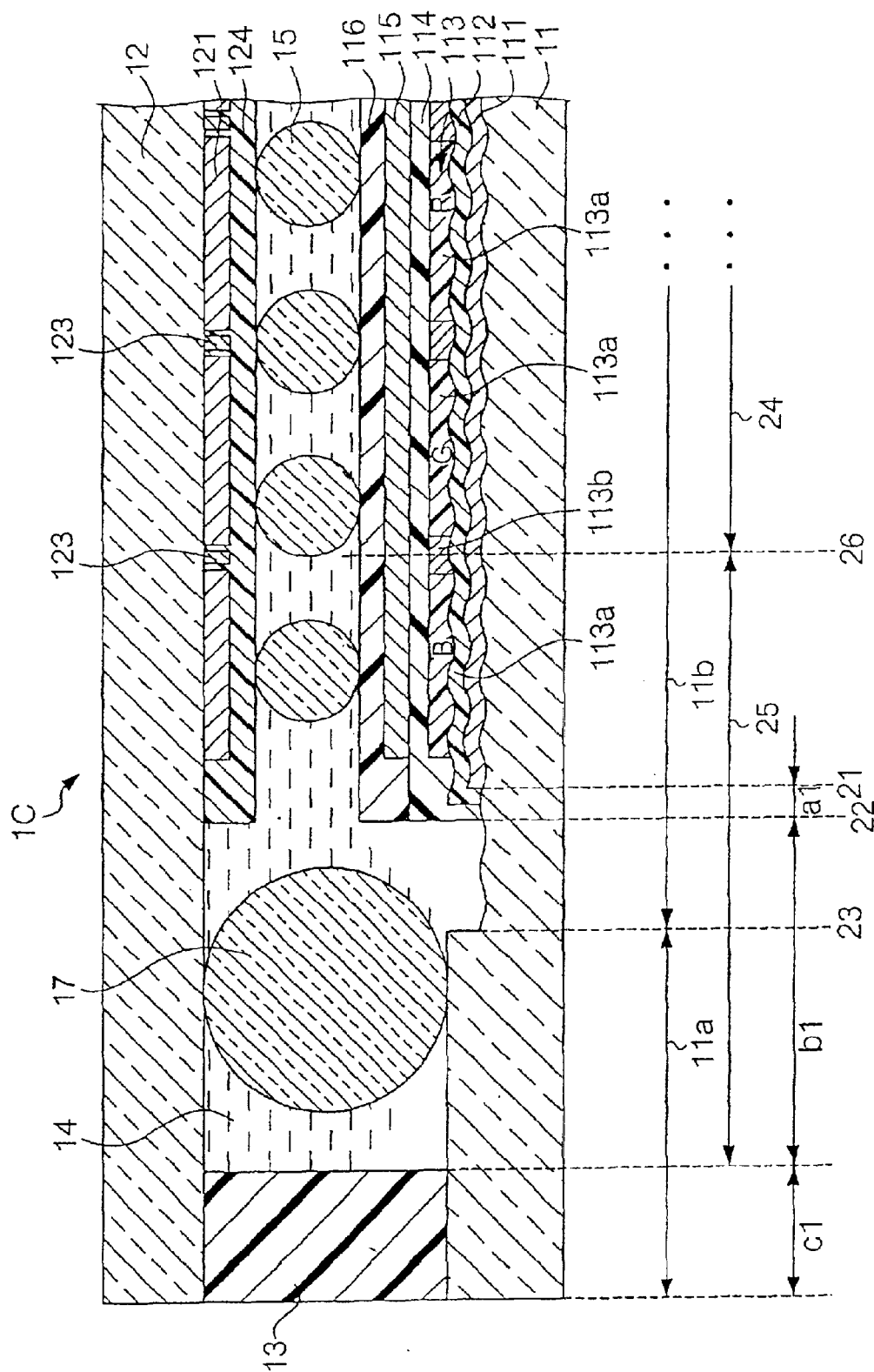

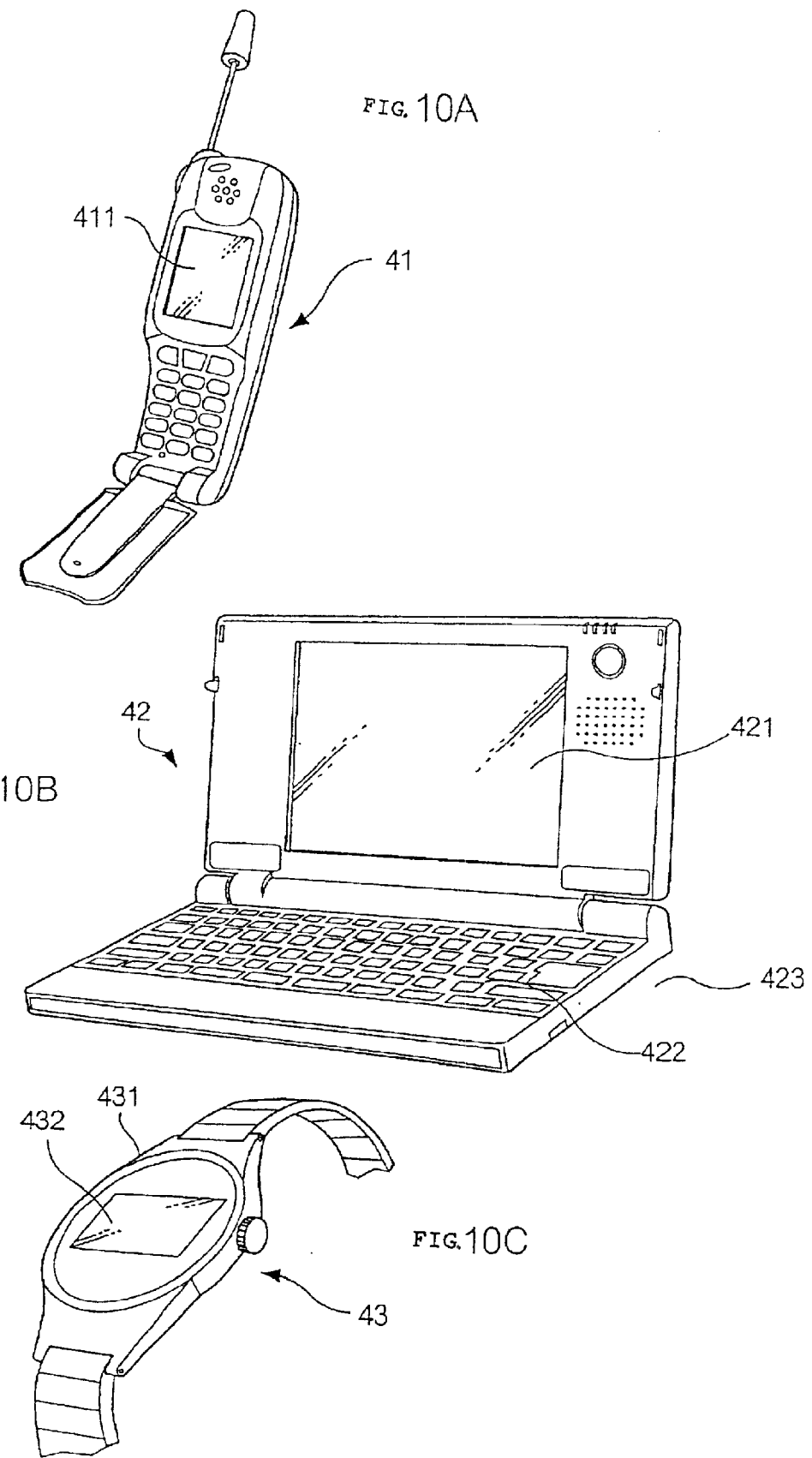

US 6,946,679 B2

LIQUID CRYSTAL DISPLAY DEVICE, MANUFACTURING METHOD THEREFOR, AND ELECTRONIC APPARATUS

TECHNICAL FIELD

The present invention relates to liquid crystal display devices, manufacturing methods therefor, and electronic apparatuses.

BACKGROUND ART

Heretofore, liquid crystal display devices performing reflective display have been increasingly in demand. This type of liquid crystal display device has a structure in which outside light, such as natural light and indoor illumination incident from the front side (observer side) is reflected at a reflective layer, whereby reflective display is performed. According to this structure, since no backlight is required, reflective display has advantages in that low electric power consumption and reduction in weight can be achieved. As a result, reflective liquid crystal display devices, typically represented by portable electronic apparatuses or the like, are widely used.

FIG. 11 is a cross-sectional view showing an example of the structure of a conventional reflective liquid crystal display device. In this figure, a passive matrix liquid crystal display device 5A is shown by way of example. As shown in this figure, the liquid crystal display device 5A has a structure in which a backside substrate 51 and a front substrate 52 are bonded together by a sealing material 53 in the form of a frame. Liquid crystal 54 is enclosed between the substrates. In addition, on the surface of the front substrate 52 at the liquid crystal 54 side, a plurality of transparent electrodes 521 extending in a predetermined direction is formed. Furthermore, the surface of the front substrate 52 having the transparent electrodes 521 formed thereon is covered with an alignment film 522. Rubbing treatment is performed on the alignment film 522 to define an alignment direction of the liquid crystal 54 when no voltage is applied thereto.

In addition, on the surface of the backside substrate 51 at the liquid crystal 54 side, a reflective layer 511, an insulating layer 512, a color filter layer 513, and a protective layer 514 are formed in this order. The reflective layer 511 is a thin-film composed of a metal (e.g., aluminum) having reflective characteristics. The insulating layer 512 is a thin-film for protecting the reflective layer 511. The color filter layer 513 is composed of a plurality of color pixels 513a and a shading layer (black matrix) 513b.

The protective layer 514 is a thin-film for protecting the color filter layer 513. On the surface of the protective layer 514, a plurality of transparent electrodes 515 is formed extending in the direction perpendicular to the transparent electrodes 521. The surface of the protective layer 514 having the transparent electrodes 515 formed thereon is covered with an alignment film 516 similar to the alignment film 522.

Furthermore, between the alignment film 516 at the backside substrate 51 side and the alignment film 522 at the front substrate 52 side, a plurality of spheric spacers 55 is dispersed. These spacers 55 are used for uniformly maintaining the distance (hereinafter referred to as "cell gap") between the backside substrate 51 and the front substrate 52.

In the structure described above, after light incident from the front substrate 52 side is transmitted through the front substrate 52 and the liquid crystal 54, the light is reflected at the reflective layer 511. The light thus reflected is again transmitted through the liquid crystal 54 and the front substrate 52 and is then emitted to the observer side. As a result, reflective display is performed.

The surface of the reflective layer 511 is a specular surface. Accordingly, as shown in FIG. 12, strong light (regular reflection light) is emitted in the direction H perpendicular to the surface of the substrate of the liquid crystal display device 5A. However, as an angle θ shown in FIG. 12 is increased, the intensity of the emitted light is decreased. As a result, at a position at which the angle θ is large, a problem may arise in that the displayed image is darkened.

In order to solve the problem described above, an external scattering liquid crystal display device is proposed. FIG. 13 is a cross-sectional view showing an example of the structure of this type of liquid crystal display device. In this connection, the same reference numerals of the elements in FIG. 11 designate the corresponding elements in FIG. 13, and descriptions therefor are omitted. As shown in FIG. 13, a liquid crystal display device 5B has a diffusion filter 56 at the outside of the front substrate 52.

In the liquid crystal display device 5B, after light incident from a front substrate 52 side is scattered by the diffusion filter 56, the light thus scattered is transmitted through the front substrate 52 and liquid crystal 54 and is then reflected at a reflective layer 511. After the light thus reflected is again transmitted through the liquid crystal 54 and the front substrate 52 and is then scattered by the diffusion filter 56, the light is emitted to an observer side. As described above, according to the liquid crystal display device 5B employing the external scattering method, in addition to the regular reflection light, the light scattered by the diffusion filter 56 can also be used. Accordingly, compared to the liquid crystal display device 5A only using the regular reflection light, strong light can be emitted to a broader area. As a result, bright display can be performed in a broader area.

However, in the liquid crystal display device 5B, while light enters the liquid crystal display device 5B and is then emitted to the observer side, light observed by the observer is scattered twice by the diffusion filter 56. Accordingly, a problem may arise in that the outline of the display image is blurred.

In order to solve the problem described above, an internal scattering liquid crystal display device is proposed. FIG. 14 is a cross-sectional view showing an example of the structure of this type of liquid crystal display device. In this connection, the same reference numerals of the elements shown in FIG. 11 designate the corresponding elements in FIG. 14, and descriptions therefor are omitted.

As shown in FIG. 14, in an internal scattering liquid crystal display device 5C, the surface of a backside substrate 51 at a liquid crystal 54 side is roughened. That is, a plurality of minute protrusions and a plurality of minute recesses are formed on the surface described above. A reflective layer 517 is formed on this roughened surface. Accordingly, on the surface of the reflective layer 517, protrusions and recesses are formed in conformity with the protrusions and recesses formed on the surface of the roughened surface.

In this liquid crystal display device 5C, after light incident from a front substrate 52 side is transmitted through a front substrate 52 and liquid crystal 54, the light is reflected at the surface of the reflective layer 517. As described above, the minute protrusions and the recesses are formed on the surface of the reflective layer 517. Accordingly, after the light reaching the reflective layer 517 is reflected in a appropriately scattered state, the light is again transmitted through the liquid crystal 54 and the front substrate 52 and is then emitted to an observer side. According to the structure described above, in addition to the regular reflection light, the scattered light can also be used, and hence, compared to the liquid crystal display device 5A only using the regular reflection light, strong light can be emitted to a broader area. As a result, high quality display can be preformed in a broader area. In addition, in the liquid crystal display device 5C, the light is scattered once. As a result, compared to the external scattering liquid crystal display device 5B, blurring along the outline of the display image can be suppressed.

In addition, a transflective liquid crystal display device employing the internal scattering method is also proposed. FIG. 15 is a cross-sectional view showing an example of the structure of this type of liquid crystal display device. In this connection, the same reference numerals of the elements in FIG. 11 or 14 designate the corresponding elements in FIG. 15, and descriptions therefor are omitted.

As shown in FIG. 15, a liquid crystal display device 5D is provided with a backlight unit 57 under a backside substrate 51. The backlight unit 57 contains a light source 571 and a light guide plate 572. The light source 571 is, for example, a cold cathode tube. The light guide plate 572 guides light incident on a side edge surface thereof, which is emitted from the light source 571, to the backside substrate 51 side. In addition, in the liquid crystal display device 5D, instead of the reflective layer 517 of the liquid crystal display device 5C described above, a transflective layer 519 is provided. The transflective layer 519 is a thin-film composed of aluminum or the like having a plurality of aperture portions 519a therein.

In the structure described above, light incident from a front substrate 52 side is transmitted through the front substrate 52 and liquid crystal 54 and is then reflected at the surface of the transflective layer 519. The light thus reflected is again transmitted through the liquid crystal 54 and the front substrate 52 and is then emitted to an observer side. As a result, a reflective display is performed.

In addition, in a dark place, the light source 571 is turned on, and transmissive display is performed. That is, light emitted from the light source 571 is guided to the backside substrate 51 side by the light guide plate 572. This light is transmitted through the backside substrate 51, the aperture portions 519a in the transflective layer 519, the liquid crystal 54, and the front substrate 52 and is then emitted to the observer side. As a result, transmissive display is performed.

In the liquid crystal display device 5C or 5D employing the internal scattering method, as shown in FIG. 14 or 15, a case is supposed in which the entire surface of the backside substrate 51 is roughened. In the case described above, a sealing material 53 is formed on the roughened surface. However, when this structure is employed, the adhesion between the sealing material 53 and the backside substrate 51 is degraded, and hence, a problem may arise in that the strength of the sealing material 53 is partly degraded. In addition, since the adhesion between the sealing material 53 and the surface of the backside substrate 51 is degraded, a gap may be formed therebetween in some cases. Furthermore, the gap thus formed may extend from an area (that is, an area formed between the backside substrate 51 and the front substrate 52 opposing thereto) at which the liquid crystal 54 is enclosed to the outside in some cases. When the gap described above is formed, a part of the enclosed liquid crystal 54 may leak outside via the gap, or the liquid crystal 54 may be mixed with water moisture penetrating from the outside into the area via the gap. As a result, a problem may arise in that the display characteristics of the liquid crystal display device are degraded.

In addition, in order to uniformly maintain the cell gap, a proposal is made in which a sealing material 53 containing cylindrical glass fibers therein is used. However, when the sealing material 53 is formed on the roughened surface, some of the glass fibers are placed on the top portions of the protrusions of the roughened surface, some of the glass fibers are placed at the bottoms of the recesses of the roughened surface, and as a result, a problem may arise in that the cell gap cannot be uniformly maintained.

In order to solve the problems described above, it may be considered that a part of the backside substrate 51 is formed to have a flat area at which the sealing material 53 is formed. In the case described above, since the sealing material 53 and the backside substrate 51 can be satisfactory bonded together, the problems described above can be solved. However, when the structure described above is employed, determination of the boundary between the flat area and the roughened area may become a problem.

DISCLOSURE OF INVENTION

In a typical liquid crystal display device, the structure is employed in which one to three pixels from the inside periphery of the sealing material 53 are designed to serve as dummy pixels. In FIG. 14 or 15, an example is shown in which one pixel from the inside periphery of the sealing material 53 serves as a dummy pixel. Accordingly, an area defined by one pixel from the inside periphery of the sealing material 53 is a non-display area 64 having no contribution to display, and an area inside the non-display area is a display area 63 contributing to actual display.

In addition, in order to perform superior display using the scattered light described above, at least a part of the surface of the backside substrate 51 corresponding to the display area 63 must be a roughened surface. In consideration of this situation, as shown in FIG. 16, it may be considered that a part of the backside substrate 51 corresponding to the display area 63 is formed having a roughened surface, and on the other side, a part of the backside substrate 51 corresponding to the non-display area is formed having a flat surface.

The roughened surface of the backside substrate 51 may be formed by, for example, etching a part of the flat surface of the substrate. In addition, the roughened surface may also be formed by performing a sand blast treatment in which minute recesses on the surface of the substrate are formed by blowing abrasive particles to the flat surface of the substrate. The height of the roughened surface formed by these methods described above is lower than that of the flat surface. That is, as shown in FIG. 16, a step h is formed at the boundary (that is, a boundary 65 of the display area 63 and the non-display area 64) of the roughened surface and the flat surface. As described above, pixels contributing to display are located in the display area 63, and pixels (dummy pixels) having not contribution to display are located in the non-display area 64. Accordingly, the color filter layer 513, the alignment film 516, and the like described above are formed so as to extend over the step h. As a result, as shown in FIG. 16, the surfaces of the color filter layer 513, the alignment film 516, and the like are formed so as to have steps in conformity with the step h. However, when the surface of the alignment film 516, or the like is formed to have the step as described above, problems described below may arise.

In the case described above, a plurality of spacers 55 is dispersed on the alignment film 516. However, when a step is formed on the surface of the alignment film 516, the heights of spacers dispersed on one side of the alignment film 516 and on the other side thereof with the step therebetween differ from each other. As a result, the cell gap becomes uneven. When the cell gap is uneven, color irregularity occurs on a display image, and the problem of reduced display quality may occur. In particular, since, in a STN (super twisted nematic) mode liquid crystal display device, a slightly uneven cell gap results in significant degradation of display quality, the problem described above is serious.

In addition, a rubbing treatment is performed on the alignment film 516. The rubbing treatment is a treatment in which the surface of the alignment film 516 is rubbed in a predetermined direction by a cloth or the like. However, when a step is formed on the surface of the alignment film, the cloth is not brought into contact with the peripheral portion of the display area 63 which cannot be reached by the step. That is, there is an area, i.e., a part of the display area 63, at which the rubbing treatment is not performed. The liquid crystal 54 is not aligned in a predetermined direction in the area at which the rubbing treatment is not performed. As a result, in the peripheral portion of the display area 63, display defects occur.

In FIGS. 11 to 15, the passive matrix liquid crystal display devices are described by way of example. However, the problem described above also occurs in an active matrix liquid crystal display device provided with a two-terminal element typically represented by a TFD (thin-film diode) or a three-terminal element typically represented by a TFT (thin-film transistor).

Accordingly, in order to solve the problem described above, the present invention provides a liquid crystal display device comprising a pair of substrates bonded to each other by a sealing material in the form of a frame provided therebetween, liquid crystal held between the pair of substrates, a reflective layer formed on one of the substrates at the liquid crystal side, and an alignment film formed over the reflective layer at the liquid crystal side, wherein the surface of said one of the substrates has a roughened area which is roughened and a flat area which is flat and surrounds the roughened area, the alignment film is formed in the roughened area, and the sealing material is formed in the flat area. In other words, the present invention is characterized in that the boundary of the roughened area and the flat area is located between the inside periphery of the sealing material and the periphery of the alignment film.

In this liquid crystal display device, the alignment film is formed in the roughened area. Accordingly, the alignment film does not extend over the step formed at the boundary of the roughened area and the flat area, and hence, no step is formed on the surface of the alignment film. As a result, since a plurality of spacers can be dispersed on a surface having the same height, the cell gap between the pair of substrates can be maintained uniformly.

In addition, since no step is formed on the surface of the alignment film, a rubbing treatment can be performed on the entire surface of the alignment film. That is, the generation of an area at which the rubbing treatment is not performed due to the presence of the step can be effectively avoided. As a result, superior display can be performed in the entire surface of the display area.

In addition, since the sealing material is formed in the flat area, the sealing material and said one of the substrates can be satisfactory brought into close contact with each other. Accordingly, the generation of gaps between the sealing material and said one of the substrates can be avoided. As a result, the situation can be avoided in that the liquid crystal leaks outside or water moisture flows inside from the outside.

In the liquid crystal display device, the reflective layer preferably has a plurality of apertures therein. In the arrangement described above, in addition to a reflective display using light reflected by the reflective layer, a transmissive display can also be performed by using light which is entered from said one of the substrates side and is transmitted through the apertures. Accordingly, even in the situation in which sufficient outside light cannot be obtained, bright display can be performed.

In addition, a color filter and a protective layer protecting the color filter are preferably provided between the reflective layer and the alignment film and in the roughened area of said one of the substrates. In the arrangement described above, a color display can be realized. Furthermore, since the color filter layer and the protective layer are formed in the roughened area, no step is formed on the surfaces thereof. Accordingly, by the same reason as described above, while the adhesion between the sealing material and said one of the substrates is improved, the cell gap can be more uniformly formed. Furthermore, even when the alignment film is formed on the surface of the protective layer, since no step is formed on the surface of the protective layer, the generation of step on the surface of the alignment film can be avoided.

In addition, in order to achieve the objects described above, an electronic apparatus of the present invention comprises one of the liquid crystal display devices described above. As described above, since superior display characteristics can be obtained by this liquid crystal display device, it is preferably used as a display device for various electronic apparatuses.

Furthermore, in order to achieve the objects described above, a method for manufacturing a liquid crystal display device of the present invention is a method for manufacturing a liquid crystal display device comprising a pair of substrates bonded to each other by a sealing material provided therebetween, liquid crystal held between the pair of substrates, a reflective layer formed on one of the substrates at the liquid crystal side, and an alignment film formed over the reflective layer at the liquid crystal side. The method comprises a step of covering an area in the vicinity of the periphery of the surface of said one of the substrate with a mask material, a step of roughening an area of the surface except the area covered with the mask material for forming a roughened area, a step of forming the reflective layer and the alignment film in the roughened area, a step of forming the sealing material in a flat area at which the mask material is previously formed, and a step of bonding said one of the substrates to the other substrate by the sealing material provided therebetween.

According to the liquid crystal display device obtained by this manufacturing method, the same advantages as those described above can be obtained. In the method described above, as the mask material, a resinous adhesive composed of, such as a photoresist or an epoxy resin, or a paint may be used.

In the manufacturing method described above, said one of the substrates may comprise a first composition in a mesh shape and a second composition present between the meshes of the first composition, and when the surface is roughened, etching may be performed on the said one of the substrates using a treatment solution, for which a rate of dissolution of the first composition differs from that of the second composition, for forming a roughened surface in conformity with the shape of the first composition in an area except the area covered with the mask material. As the treatment solution described above, for example, nitric acid, sulfuric acid, hydrochloric acid, hydrogen peroxide, ammonium hydrogen difluoride, ammonium fluoride, ammonium nitrate, ammonium sulfate, or ammonium hydrochloride may be used alone or in combination in an appropriate mixing ratio in accordance with a starting material for the said one of substrates to be treated. As said one of the substrates to be roughened, for example, a soda lime glass, a borosilicate glass, a barium borosilicate glass, a barium aluminosilicate glass, or an aluminosilicate glass may be used. In general, when the substrate is treated only by an aqueous solution of hydrofluoric acid, the entire surface of the substrate is uniformly etched, and hence, a roughened area cannot be formed. However, by appropriately adding an auxiliary chemical reagent which selectively dissolves constituent components contained in the substrate, a roughened area having a plurality of minute protrusions and recesses can be formed. In this connection, the auxiliary chemical reagents are not limited to those described above. In addition, it is preferable that the type of treatment solution, mixing ratio thereof, and the like be appropriately selected in accordance with a material for the substrate to be treated.

In the step of roughening the area of the manufacturing method described above, it may also be considered that the protrusions and recesses described above are formed in an area except the area covered with the mask material by bombarding the surface of said one of the substrates with abrasive particles via the mask material. That is, a so-called sand blast treatment is performed on the surface of said one of the substrates. In the step described above, as the mask material, a metal plate having apertures therein composed of, for example, a stainless steel, may be used. The mask material described above is generally inexpensive, and the durability thereof is also high, and hence, advantage in that manufacturing cost can be significantly decreased can be obtained. In addition, the mask material can be easily removed after the sand blast treatment is completed, and hence, an additional step of removing the mask material is not necessary.

Each manufacturing method described above preferably further comprises, after the step for forming the roughened area, a step of removing the mask material and a step of etching the area which is previously covered with the mask and the roughened area. By the etching described above, the shape of the roughened area can be controlled to have a predetermined shape. In the step described above, when etching is performed before the mask material is removed, a problem may arise in that the difference in height between the roughened area and the flat area is increased. As a result, when the difference in height exceeds a predetermined cell gap of the liquid crystal display device, the substrate cannot be used for the liquid crystal display device. On the other hand, when etching is uniformly performed on the roughened area and the flat area after the mask material is removed, advantage can be obtained in that the increase in difference in height between the two areas can be suppressed.

BRIEF DESCRIPTION OF THE DRAWINGS

FIG. 3 is a plan view showing an example of the positional relationship of a roughened area of a backside substrate, a sealing material, and an alignment film in the liquid crystal display device of the first embodiment according to the present invention.

FIG. 4 is a cross-sectional view showing an example of the structure of a liquid crystal display device of a second embodiment according to the present invention.

FIG. 5 is a cross-sectional view showing an example of the structure of a liquid crystal display device of a third embodiment according to the present invention.

FIG. 10A is a perspective view showing a portable communication terminal using a liquid crystal display device of the present invention.

FIG. 10B is a perspective view showing a notebook type personal computer using a liquid crystal display device of the present invention.

FIG. 10C is a perspective view showing a watch using a liquid crystal display device of the present invention.

BEST MODE FOR CARRYING OUT THE INVENTION

Hereinafter, embodiments of the present invention will be described with reference to drawings.

<A: Structure of Liquid Crystal Display Device>

<A-1: First Embodiment>

The structure of a liquid crystal display device according to the first embodiment of the present invention will first be described. In this embodiment, an internal scattering liquid crystal display device using thin-film transistors as switching elements is described by way of example.

Figure 1:
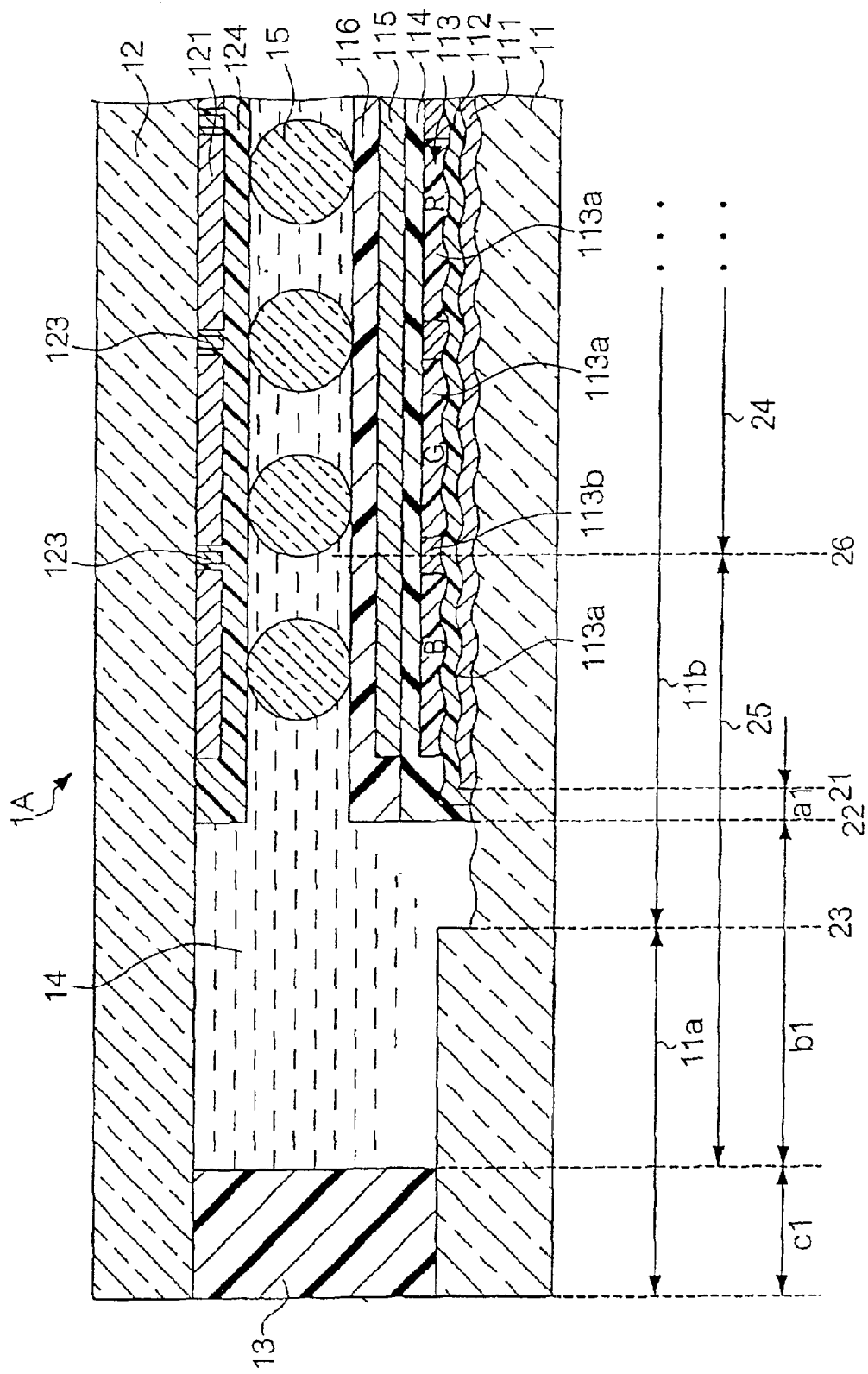
FIG. 1 is a cross-sectional view showing an example of the structure of a liquid crystal display device of a first embodiment according to the present invention.
Figure 2:
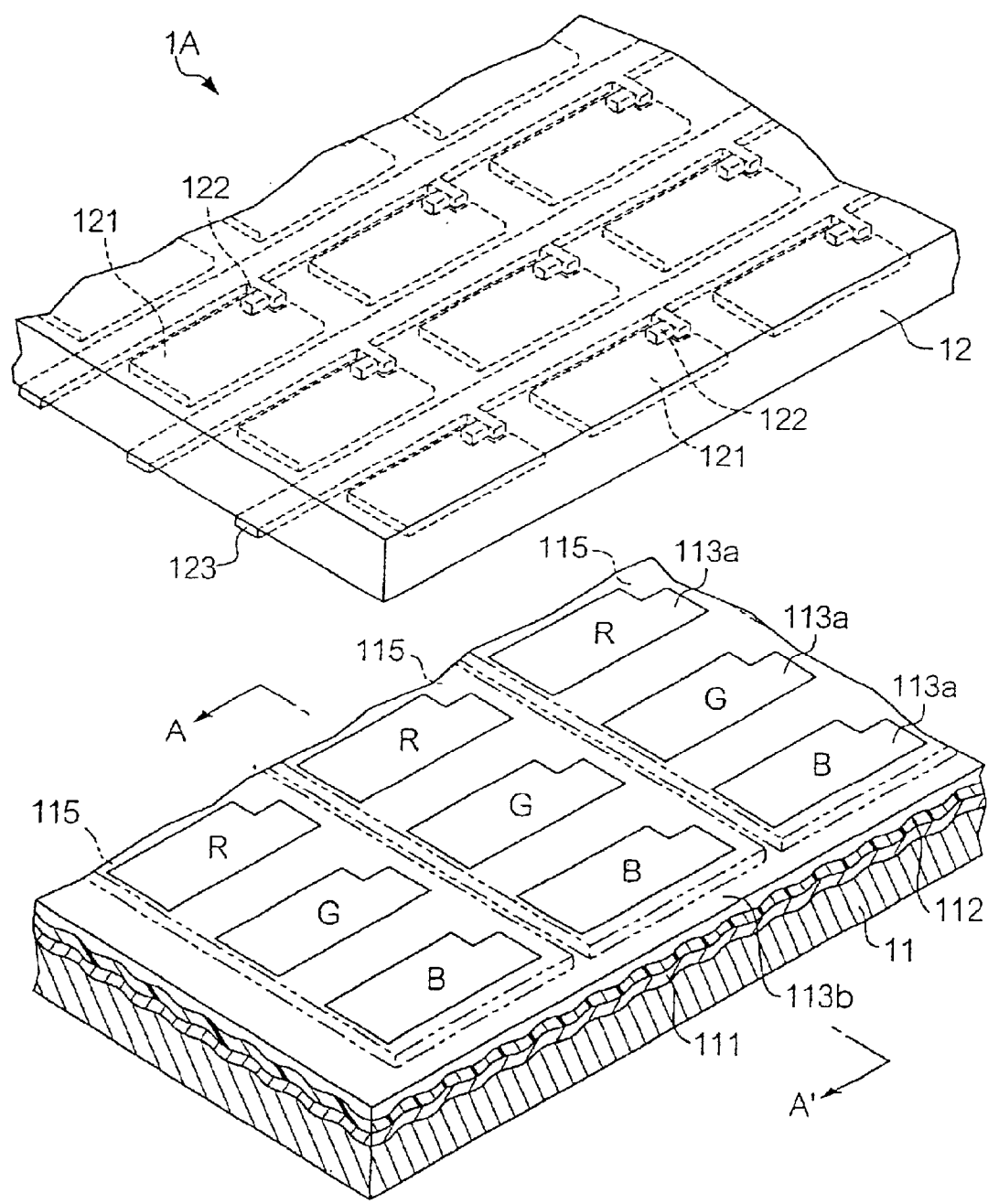
FIG. 2 is an exploded perspective view showing an example of the structure of the liquid crystal display device of the first embodiment according to the present invention.

FIG. 1 is a cross-sectional view showing an example of a part of the structure of a liquid crystal display device 1A of this embodiment. FIG. 2 is an exploded perspective view of the liquid crystal display device 1A. FIG. 1 is a cross-sectional view taken along the line A–A' in FIG. 2. As shown in these figures, the liquid crystal display device 1A has a structure in which a backside substrate 11 and a front substrate 12 are bonded together by a sealing material 13 provided therebetween in the form of a frame. Liquid crystal 14 is enclosed between the two substrates. The backside substrate 11 and the front substrate 12 are formed of glass, quartz, a plastic, or the like and have light permeability. In the structure of this liquid crystal display device, a polarizer for polarizing incident light, a retardation plate, and the like are actually bonded to the front substrate 11 at the surface thereof opposite to the liquid crystal 14; however they are omitted in the figures.

As shown in FIGS. 1 and 2, on the surface of the front substrate 12 at the liquid crystal 14 side, a plurality of pixel electrodes 121 is aligned in a matrix. The individual pixel electrodes 121 are formed of a transparent conductive material such as ITO (indium tin oxide). In addition, as shown in FIG. 2, on the surface of the front substrate 12 at the liquid crystal 14 side, a plurality of scanning lines 123 is formed extending in a predetermined direction. Each pixel electrode 121 and a scanning line 123 adjacent thereto are connected with each other by a TFD 122.

As shown in FIG. 1, the surface of the front substrate 12 having the pixel electrodes 121, the TFDs 122, and scanning lines 123 formed thereon is covered with an alignment film 124. Rubbing treatment is performed on the alignment film 124 to define an alignment direction of the liquid crystal 14 when no voltage is applied thereto. The rubbing treatment is a treatment in which the surface of the alignment film 124 is rubbed in a predetermined direction by a cloth or the like.

As shown in FIG. 1, the surface of the backside substrate 11 at the liquid crystal 14 side is composed of a flat area 11$a$ and a roughened area 11$b$. In the roughened area 11$b$, a number of minute protrusions and recesses are present. The distance between the top portion of the protrusion and the bottom of the recess on the roughened area 11$b$ is approximately from $0.5 \times 10^{-6}$ m to $2.5 \times 10^{-6}$ m. In addition, the distance between the top portion of an optional protrusion on the roughened surface 11$b$ and the top portion of another protrusion adjacent to the optional protrusion is approximately from $10 \times 10^{-6}$ m to $15 \times 10^{-6}$ m. On the other hand, the flat area 11$a$ is an area having a flat surface.

In FIG. 3, the positional relationship between the flat area 11$a$ and the roughened area 11$b$ on the surface of the backside substrate 11 is shown. As shown in this figure, the flat area 11$a$ extends along the periphery of the backside substrate 11 so as to surround the roughened area 11$b$ (an area indicated by oblique lines in FIG. 3). The sealing material 13 in the form of a frame is formed in the flat area 11$a$. The width c1 of the sealing material 13 (see FIG. 1) is, for example, approximately from $0.8 \times 10^{-3}$ to $1.1 \times 10^{-3}$ m. A method for selectively forming the flat area 11$a$ and the roughened area 11$b$ on the surface of the backside substrate 11 will be described below.

In addition, as shown in FIG. 1, in the roughened area 11$b$ of the backside substrate 11, a reflective layer 111 is formed. The reflective layer 111 is a layer for reflecting light incident from the front substrate 12 side. The reflective layer 111 is formed of a metal, such as aluminum, having reflecting characteristics. As shown in FIG. 1, on the surface of the reflective layer 111, protrusions and recesses are formed in conformity with the minute protrusions and the recesses in the roughened area 11$b$. That is, a scattering structure is formed for reflecting light, which reaches the reflective layer 111, in an appropriately scattered state. The reflective layer 111 is covered with an insulating layer 112. The insulating layer 112 is a thin-film for protecting the reflective layer 111 and is formed of silicon dioxide or the like. As shown in FIG. 1, on the surface of the insulating layer 112, protrusions and recesses are formed in conformity with the protrusions and the recesses on the surface of the reflective layer 111.

On the insulating layer 112, a color filter layer 113 is formed which is composed of a plurality of color pixels 113a and a shading layer 113b. Each color pixel 113a is colored to, for example, one of R (red), G (green), and B (blue). As shown in FIG. 2, color pixels of each color are aligned in accordance with a predetermined rule. These color pixels 113a are formed by, for example, a color resist method, a dye method, a transfer method, or a printing method. In addition, the shading layer 113b is formed between individual color pixels 113a. The shading layer 113b is formed of, for example, metal such as chromium, or a color resist having black pigment dispersed therein.

On the surface of the color filter layer 113, a protective layer 114 is formed. The protective layer 114 is an organic thin-film for protecting the color filter 113. As shown in FIG. 1, the protective layer is formed so as to fully cover the reflective layer 111, the insulating layer 112, and the color filter layer 113. The distance a1 from the periphery 21 of the reflective layer 111 to the periphery 22 of the protective layer 114 is, for example, approximately from $0.02 \times 10^{-3}$ to $0.05 \times 10^{-3}$ m. In addition, it is preferable that the distance b1 from the periphery 22 of the protective layer 114 to an inside periphery of the sealing material 13 be approximately from $0.1 \times 10^{-3}$ to $1.1 \times 10^{-3}$ m.

On the surface of the protective layer 114, a plurality of transparent electrodes 115 is formed. As shown in FIG. 2, the transparent electrodes 115 are electrodes in the form of a strip extending in the direction crossing the plurality of scanning lines 123 described above. The transparent electrodes 115 oppose the plurality of pixel electrodes 121 aligned at the front substrate 12 side. The surface of the protective layer 114 having the transparent electrodes 115 formed thereon is covered with an alignment film 116. The alignment film 116 is an organic thin-film similar to the alignment film 124 formed on the front substrate 12.

In a space between the alignment film 124 on the front substrate 12 and the alignment film 116 on the backside substrate 11, a plurality of spacers 15 is dispersed (omitted in FIG. 2). These spacers 15 are used for maintaining the cell gap between the two substrates constant and are formed of, for example, silicon dioxide, or polystyrene.

The reflective layer 111, the insulating layer 112, the color filter layer 113, the protective layer 114, and the alignment film 116 are formed in the roughened area 11b on the backside substrate 11. The formations mentioned above are described below in detail. In this embodiment, as shown in FIG. 1, the periphery 22 of the protective layer 114 is located outside (that is, the sealing material 13 side) the periphery 21 of the reflective layer 111. In addition, the alignment film 116 is formed over the surface of the protective layer 114. Accordingly, among the elements formed on the backside substrate 11, the periphery 22 of the protective layer 114 is located at the outermost place when observed from the front substrate 12 side. In addition, as shown in FIG. 1, the protective layer 114 is formed so as to be in the roughened area 11b of the backside substrate 11. Accordingly, the reflective layer 111, the insulating layer 112, the color filter 113, the protective layer 114, and the alignment film 116 are all formed in the roughened area 11b. In other words, the elements formed on the backside substrate 11 do not extend over the step formed at the boundary 23 of the flat area 11a and the roughened area 11b. As shown in FIG. 1, an area from the inside periphery of the sealing material 13 to the pixel located at the outermost place among the pixels aligned in a matrix is a non-display area 25, and an area inside the non-display area 25 is the display area 24. Accordingly, as it is understood from a boundary 26 shown in FIG. 3, the entire display area 24 is formed in the roughened area 11b when observed from the front substrate 12 side.

As described above, in this embodiment, the surface of the backside substrate 11 at the liquid crystal 14 side is composed of the flat area 11a and the roughened area 11b. In addition, the reflective layer 111, the insulating layer 112, the color filter layer 113, the protective layer 114, and the alignment film 116 are all formed in the roughened area 11b. That is, all elements formed on the backside substrate 11 do not extend over the step formed at the boundary 23 between the flat area 11a and the roughened area 11b. Accordingly, on the surfaces of the individual elements, a step is not formed corresponding to the step between the flat area 11a and the roughened area 11b. Hence, in this embodiment, the cell gap can be uniformly maintained. In addition, since no step is formed on the surface of the alignment film 116, the generation of an area at which a rubbing treatment is not performed can be avoided.

On the other hand, since the sealing material 13 is formed on the flat area 11a, the sealing material 13 and the backside substrate 11 can be brought into close contact with each other. Accordingly, the formation of gaps between the sealing material 13 and the backside substrate 11 can be avoided. As a result, a situation can be avoided in which the liquid crystal 14 leaks outside or water moisture flows inside from the outside. In addition, since glass fibers or the like contained in the sealing material 13 are placed in the flat area 11a, the cell gap can be uniformly maintained. As a result, high quality display can be realized.

<A-2: Second Embodiment>

The reflective liquid crystal display device 1A of the first embodiment can be driven at a low electric power. However, in the situation in which outside light is not sufficient, there is a problem in that the display is darkened. In a transflective liquid crystal display device described below, reflective display is performed when outside light is sufficient, and transmissive display is performed when outside light is insufficient. FIG. 4 is a cross-sectional view showing the structure of a liquid crystal display device 1B of this embodiment. In this connection, the same reference numerals of the elements shown in FIG. 1 designate the corresponding elements shown in FIG. 4, and descriptions therefor are omitted.

As shown in FIG. 4, in the liquid crystal display device 1B, a backlight unit 16 is provided under a backside substrate 11. The backlight unit 16 comprises a light source 161 and a light guide plate 162. The light source 161 is, for example, a cold cathode tube and emits light to the light guide plate 162. The light guide plate 162 guides light, which is emitted from the light source 161, incident on a side edge surface to the backside substrate 11 side.

In the liquid crystal display device 1B of this embodiment, instead of the reflective layer 111 of the liquid crystal display device 1A described above, a transflective layer 117 is provided. The transflective layer 117 is a thin-film having a plurality of apertures 117a therein. In this embodiment, as shown in FIG. 4, one aperture 117a is provided in each pixel. The light, which is emitted from the light guide plate 162 and is then transmitted through the backside substrate 11, reaches a front substrate 11 side via the aperture 117a. As a result, transmissive display is performed. In this connection, the number of apertures 117a in one pixel is preferably determined in accordance with an aperture ratio required for obtaining a predetermined transmissive characteristic.

In addition, the transflective layer 117 is formed of, for example, a metal having reflecting characteristics, such as aluminum. Accordingly, the light incident on the front substrate 11 side is reflected at the surface of the transflective layer 117. As a result, reflective display can be performed.

In this embodiment, the same advantages can be obtained as those obtained in the first embodiment. In addition, according to this embodiment, as described above, even when outside light is not sufficient, bright display can be performed.

<A-3: Third Embodiment>

Next, referring to FIG. 5, a liquid crystal display device 1C of the third embodiment according to the present invention will be described. In this connection, the same reference numerals of the elements shown in FIG. 1 designate the corresponding elements shown in FIG. 5, and descriptions therefor are omitted.

In the first and the second embodiments, the plurality of spacers 15 is dispersed only between the alignment film 124 formed on the front substrate 12 and the alignment film 116 formed above the backside substrate 11. In addition to the above, in this embodiment, a plurality of spacers 17 is dispersed between a flat area 11a of the backside substrate 11 and the front substrate 12. Each spacer 17 has a spherical form. In addition, as shown in FIG. 5, the diameter of the spacer 17 is approximately equivalent to the gap between the flat area 11a of the backside substrate 11 and the front substrate 12. Accordingly, the diameter of the spacer 17 is larger than that of the spacer 15. In this connection, the plurality of spacers 15 and the plurality of spacers 17 are selectively dispersed in the areas described above by an inkjet method.

In this embodiment, the same advantages can be obtained as those obtained in the first embodiment. In addition, according to this embodiment, since the spacers 17 are dispersed not only between alignment films 124 and 116, but also between the flat area 11a of the backside substrate 11 and the front substrate 12, a uniform cell gap can be reliably obtained. As a result, display having higher quality can be realized.

<A-4: Modified Embodiments>

The shape of the roughened area 11b of the backside substrate 11 is not limited to those shown in FIGS. 1, 4, and 5. That is, as long as the reflective layer 111 (the transflective layer 117 in the second embodiment) formed on the roughened area 11b has a shape exhibiting a predetermined scattering characteristic, any type of protrusion and recess on the roughened area 11b may be used.

In the first to the third embodiments, the color filter layer 113 is formed above the backside substrate 11, and the TFDs 124 are formed on the front substrate 12. However, the TFDs 124 may be formed on the backside substrate 11, and the color filter layer 113 may be formed on the front substrate 12. In the case described above, on the surface of the reflective layer 111, a plurality of TFD elements 122, a plurality of pixel electrodes 121, and a plurality of scanning lines 123 are formed. In addition, the surface of the reflective layer having these elements formed thereon is covered with the alignment film 124. In addition, when the TFDs 122 are formed on the backside substrate 11, the reflective layer 111 may be formed so as to reflect incident light and also to serve as the pixel electrode 121.

In the first to the third embodiments, the active matrix liquid crystal display device is described by way of example. However, the present invention may be applied to a passive matrix liquid crystal display device. In addition, in the first to the third embodiments, the TFD 122, a two-terminal element, is described as a switching element by way of example; however, the present invention can be applied to a liquid crystal display device provided with three-terminal elements typically represented by a TFT (thin-film transistor) as a switching element.

In the first to the third embodiments, all elements formed on the backside substrate 11, i.e., the reflective layer 111 (the transflective layer 117), the insulating layer 112, the color filter 113, the protective layer 114, and the alignment film 116, are all formed in the roughened area 11b. However, all elements described above are not necessarily formed in the roughened area 11b, and at least the alignment film 116 is preferably formed in the roughened area 11b. Alternatively, since the alignment film 116 is formed on the surface of the protective layer 114, the protective layer is preferably formed in the roughened area 11b.

<B: Method for Manufacturing Liquid Crystal Display Device>

Next, methods for manufacturing the liquid crystal display devices of the first to the third embodiments will be described by way of example. In this description, the case is supposed in which four backside substrates are obtained from one piece of a glass substrate.

<B-1: First Manufacturing Method>

Referring to FIGS. 6A to 6F, the first manufacturing method for a liquid crystal display device will first be described.

Figure 6A:
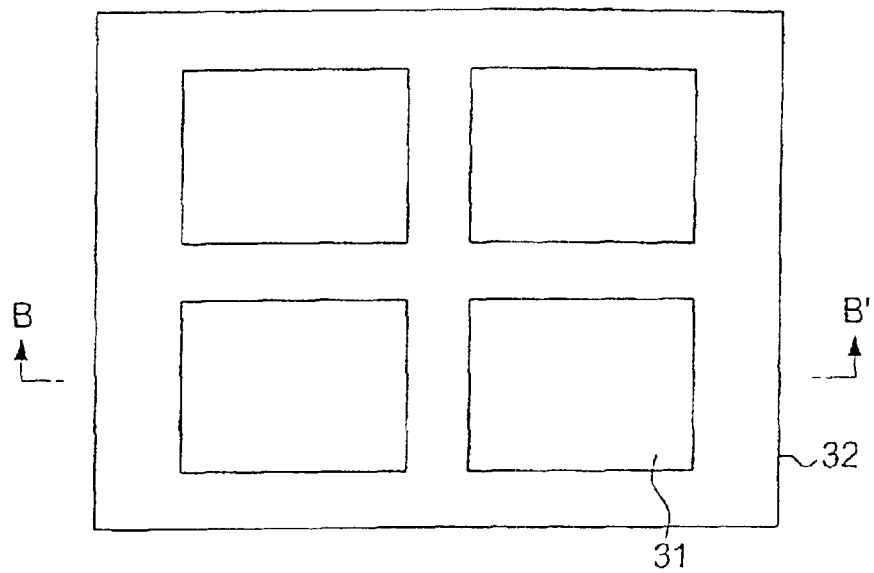
FIG. 6A is a plan view showing the state in which a photoresist is formed on a backside substrate in a first manufacturing method for a liquid crystal display device of the present invention.
Figure 6B:
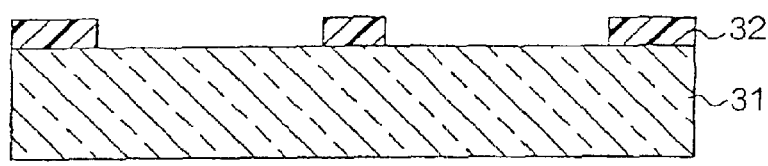
FIG. 6B is a cross-sectional view taken along the line B–B' in FIG. 6A.

A glass substrate 31 is first prepared having enough size to obtain four backside substrates. On areas of the surface of the glass substrate 31 at which flat areas 11a of backside substrates 11 are formed, a mask material 32 is formed. In particular, as shown in FIGS. 6A and 6B, the mask material 32 is formed so as to surround individual four areas (corresponding to the backside substrates 11) which are formed by dividing the glass substrate 31. The mask material 32 is, for example, a photoresist, or a laminated film.

Figure 6C:
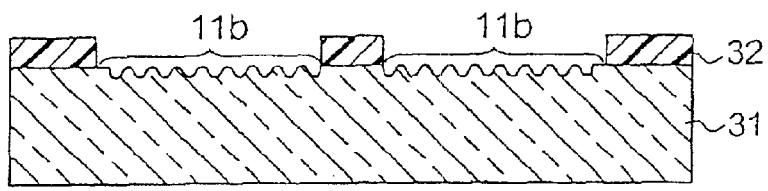
FIG. 6C is a cross-sectional view showing the state in which a part of the surface of the backside substrate is roughened in the first manufacturing method for the liquid crystal display device of the present invention.
Figure 6D:
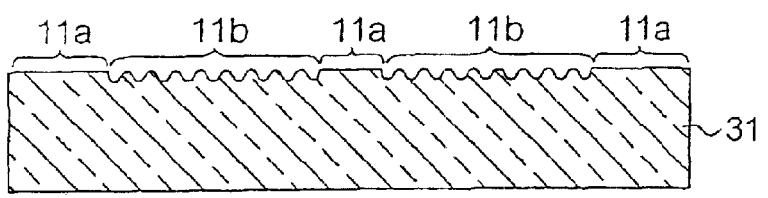
FIG. 6D is a cross-sectional view showing the state in which a mask material is removed in the first manufacturing method for the liquid crystal display device of the present invention.

Next, as shown in FIG. 6C, areas of the surface of the glass substrate 31 are roughened which are not covered with the mask material 32. Roughening treatment performed in this step will be described below. In addition, as shown in FIG. 6D, the mask material 32 is removed. As a result, in one surface of the glass substrate 31, the area having the mask material 32 thereon becomes a flat area 11a, and the other areas become roughened areas 11b.

Figure 6E:
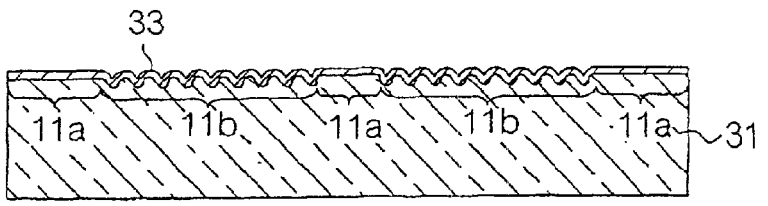
FIG. 6E is a cross-sectional view showing an example of the state in which a metal film is formed on the backside substrate in the first manufacturing method for the liquid crystal display device of the present invention.
Figure 6F:
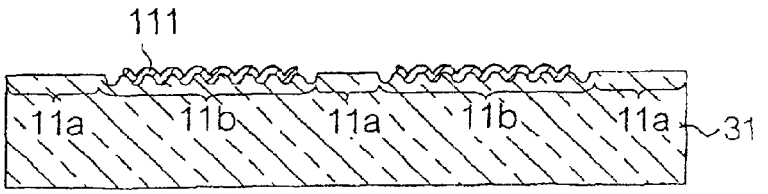
FIG. 6F is a cross-sectional view showing an example of the state in which a reflective layer is formed on the backside substrate in the first manufacturing method for the liquid crystal display device of the present invention.

Subsequently, as shown in FIG. 6E, over the entire surface of the glass substrate 31 composed of the flat area 11a and the roughened areas 11b, a metal film 33 having reflecting characteristics is formed. The metal film 33 is formed of, for example, a metal element, such as aluminum or silver, or an alloy primarily composed of aluminum, silver, or the like. Next, as shown in FIG. 6F, the metal film 33 is removed from the surface of the glass substrate except the roughened areas 11b. Patterning of the metal film 33 can be performed by, for example, a photolithographic method. Metal film 33 remaining in the roughened area 11b is used as the reflective layer 111 described above. On the surface of the reflective layer 111, protrusions and recesses are formed which are in conformity with the minute protrusions and recesses of the roughened area 11b. After the treatments described above are performed, an insulating layer 112, a color filter 113, a protective layer 114, a transparent electrode 115, and an alignment film 116 are sequentially formed in the roughened area 11b of the backside substrate 11 covered with the reflective layer 111. In addition, when the liquid crystal display device 1B of the second embodiment is manufactured, a step of forming the transflective layer 117 by providing the aperture portions 117a in the reflective layer 111 is additionally performed. Next, on the flat area 11a surrounding the roughened areas 11b, a sealing material 13 in the form of a frame is formed.

When the glass substrate 31 having reflective layers 111 and the sealing material 13 formed thereon is obtained, the glass substrate 31 and another glass substrate are bonded together by the sealing material 13 provided therebetween. In addition, liquid crystal 14 is enclosed between the pair of substrates and in an area surrounded by the sealing material 13. The pair of glass substrates is then separated into individual liquid crystal display devices.

Hereinafter, particular examples will be described which relates to steps (that is, steps shown in FIGS. 6A to 6D) of forming the roughened area 11b by selectively roughening the surface of the backside substrate 11.

Roughening Method 1

In Roughening Method 1 described below, an aluminosilicate glass substrate is used as the glass substrate 31.

Figure 7A:
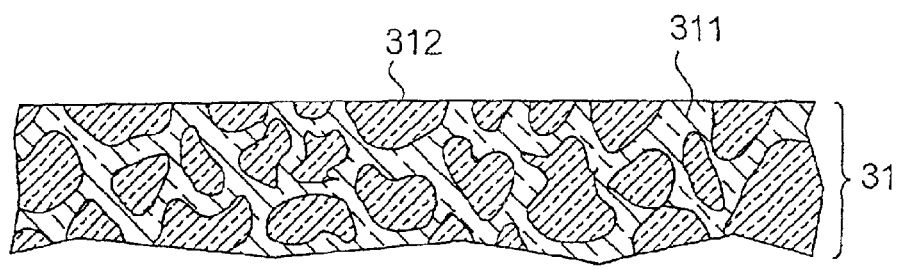
FIG. 7A is a schematic cross-sectional view showing the structure of a glass substrate in a first roughening method for forming a roughened area on a backside substrate.

FIG. 7A is a schematic view showing a mesh structure in section of the glass substrate 31. As shown in the figure, the glass substrate 31 is composed of a mesh texture 311 and a mesh modifier 312 present so as to fill the spaces between the meshes. The mesh texture 311 is formed of, for example, a copolymer of silicic acid and aluminum oxide. The mesh modifier 312 is formed of, for example, magnesium oxide.

Etching is first performed on the glass substrate 31, which is also performed for washing purpose. In particular, the glass substrate 31 is immersed in, for example, an aqueous solution of hydrofluoric acid at a concentration of approximately 5 wt % at 25° C. for approximately 5 seconds.

Figure 7B:
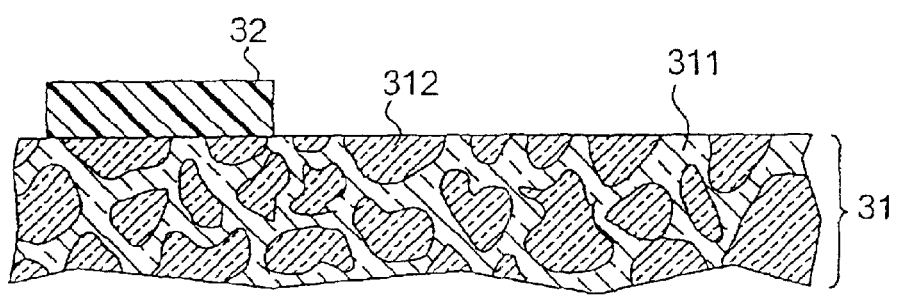
FIG. 7B is a cross-sectional view showing the state in which a mask material is formed on the glass substrate in the first roughening method.

Next, as shown in FIG. 7B, the mask material 32 is formed on the area at which the flat area 11a of the glass substrate 31 is to be formed. The shape of the mask material 32 is equivalent to those shown in FIGS. 6A and 6B.

Figure 7C:
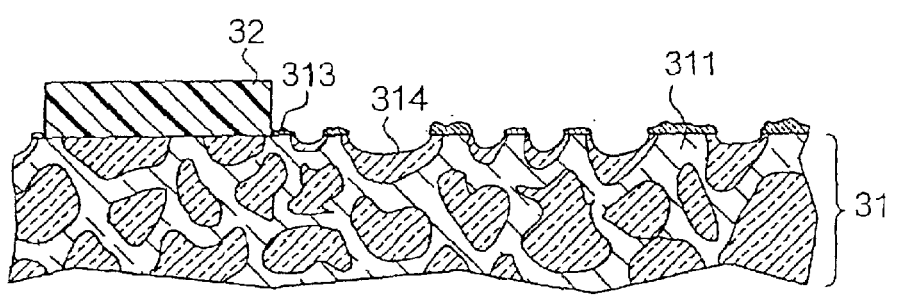
FIG. 7C is a cross-sectional view showing the state in which first etching is performed on the glass substrate in the first roughening method.

Subsequently, the glass substrate 31 is immersed in an aqueous solution of hydrofluoric acid at a concentration of 30 wt % containing supersaturated aluminum oxide and magnesium oxide at 25° C. for approximately 30 seconds (hereinafter, this treatment is referred to as "first etching"). In this treatment, at parts of the mesh texture 311 at which aluminum oxide is localized, aluminum oxide in the super saturated solution is precipitated, and at parts of the mesh modifier 312 at which magnesium oxide is localized, magnesium oxide in the saturated solution is precipitated. As a result, as shown in FIG. 7C, a fine network structure 313 is formed on the surface of the glass substrate 31. In addition, parts of the mesh texture 311 and the mesh modifier 312 formed of components which are not supersaturated in a treatment solution (that is components other than aluminum oxide and magnesium oxide) are etched by hydrofluoric acid. As a result, on the surface of the glass substrate 31, recesses 314 are formed in areas except that the network structure 313 described above is formed.

Figure 7D:
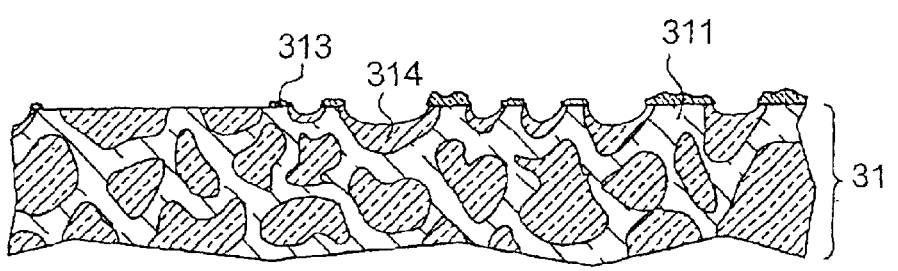
FIG. 7D is a cross-sectional view showing the state in which the mask material on the glass substrate is removed in the first roughening method.

Next, as shown in FIG. 7D, the mask material 32 is removed. Since the area at which the mask material 32 is previously formed is not treated by the first etching, the flat surface is maintained.

Figure 7E:
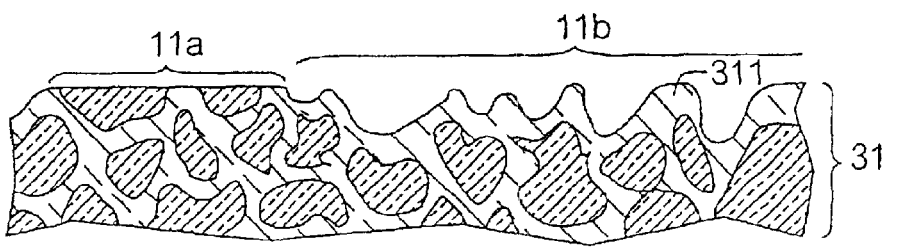
FIG. 7E is a cross-sectional view showing the state in which second etching is performed on the glass substrate in the first roughening method.

Subsequently, uniform etching (hereinafter referred to as "second etching") is performed on the entire surface of the glass substrate 31. In particular, first, a solution is first prepared which is formed by mixing one part by weight of hydrofluoric acid at a concentration of 50 wt % and three parts by weight of an aqueous solution of ammonium fluoride at a concentration of 40 wt %. The glass substrate 31 is then immersed in this solution at 25° C. for approximately 20 seconds. By this treatment, the network structure 313 described above and minute protrusions (not shown in the figure) formed in the recesses 314 are removed. As a result, as shown in FIG. 7E, the area of the glass substrate 31 at which the mask material 32 is not formed becomes a roughened area 11b having smooth protrusions and recesses. On the other hand, the area at which the mask material 32 is previously formed becomes a flat area 11a having a flat surface.

In the step described above, it may be considered that the second etching is performed before the mask material 32 is removed. However, in the case described above, the second etching is not performed on the area at which the mask material 32 is formed and is performed on the other area. As a result, the difference in height between the flat area 11a and the roughened area 11b is increased by performing the second etching. When the difference in height between the flat area 11a and the roughened area 11b exceeds a predetermined cell gap in the liquid crystal display device, a problem may arise in that the cell gap cannot be obtained when the glass substrate described above is used. On the other hand, in this embodiment, since the second etching is performed on the entire surface of the glass substrate 31 after the mask material 32 is removed, the increase in difference in height between the flat area 11a and the roughened area 11b can be avoided.

Second Roughening Method

Next, referring to FIGS. 8A to 8E, the second roughening method for selectively roughening the surface of the backside substrate 11 will be described. In this method, the case will be described by way of example in which a substrate composed of a soda lime glass is used as a glass substrate 31.

Figure 8A:
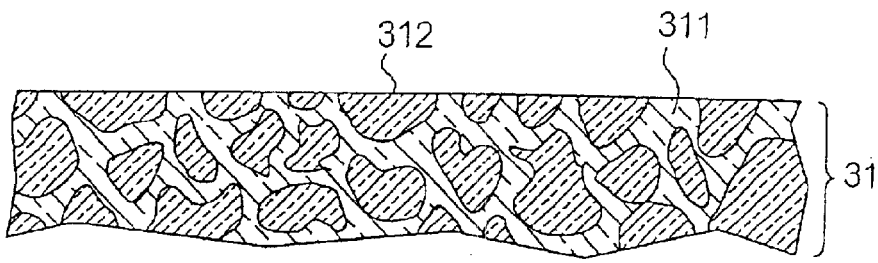
FIG. 8A is a schematic cross-sectional view showing the structure of a glass substrate in a second roughening method for forming a roughened area on a backside substrate.

As shown in FIG. 8A, this glass substrate 31 is similar to the glass substrate 31 in the first roughening method described above in terms of having a mesh texture 311 and a mesh modifier 312. However, in the glass substrate 31 shown in FIG. 8A, the mesh texture 311 is formed of silicic acid, and the mesh modifier 312 is formed of an alkaline metal, or an alkaline earth metal. Accordingly, the points described above differ form the glass substrate 31 in the first roughening method.

Figure 8B:
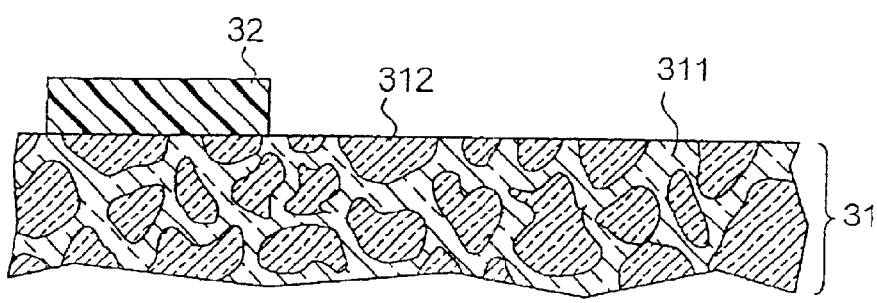
FIG. 8B is a cross-sectional view showing the state in which a mask material is formed on the glass substrate in the second roughening method.

Etching is first performed on the glass substrate 31, which is also performed for washing purpose. In particular, the glass substrate 31 is immersed in an aqueous solution of hydrofluoric acid at a concentration of 5 wt % at 25° C. for approximately 5 seconds. Next, as shown in FIG. 8B, a mask material 32 is formed on an area of the surface of the glass substrate 31 at which a flat area 11a is to be formed. The shape of the mask material 32 is equivalent to those shown in FIGS. 6A and 6B.

Figure 8C:
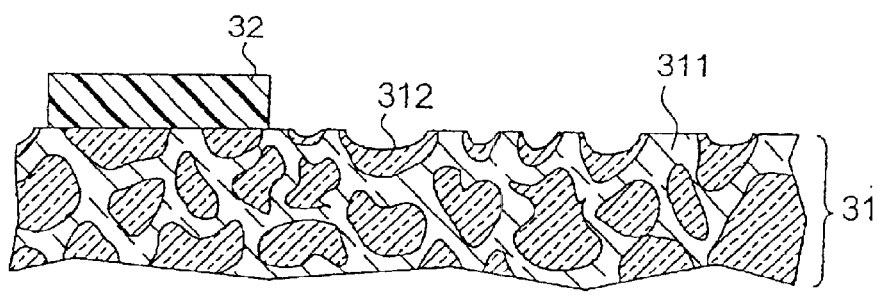
FIG. 8C is a cross-sectional view showing the state of an etching process in the second roughening method.
Figure 8D:
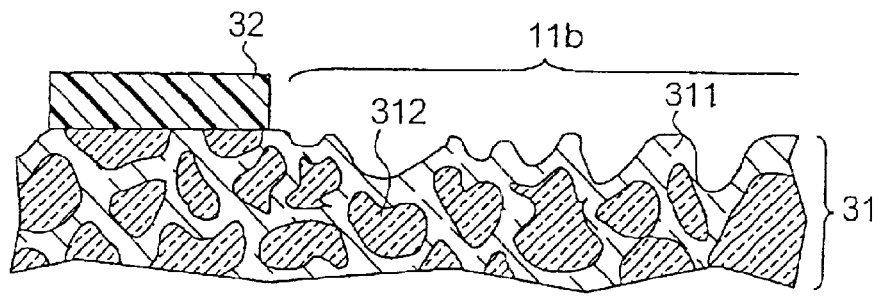
FIG. 8D is a cross-sectional view showing the state in which the etching is complete in the second roughening method.
Figure 8E:
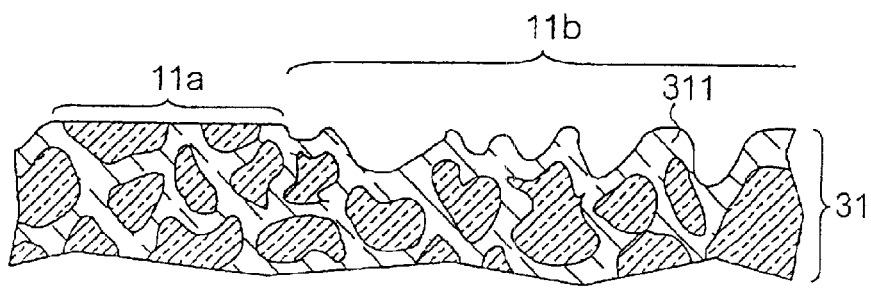
FIG. 8E is a cross-sectional view showing the state in which the mask material on the glass substrate is removed in the second roughening method.

Subsequently, the glass substrate 31 is immersed in a treatment solution of hydrofluoric acid at a concentration of 30 wt % and ammonium hydrogen difluoride at a concentration of 45 wt % at 25° C. for approximately 15 seconds. In this treatment, as shown in FIG. 8C, in the components constituting the glass substrate 31, the rate of dissolution of the mesh modifier 312 in the treatment solution is faster than that of the mesh texture 311. Accordingly, when the glass substrate 31 is immersed in the treatment solution, as shown in FIG. 8D, a roughened area 11b is formed which has protrusions and recesses in conformity with the mesh texture 311. Next, as shown in FIG. 8E, the mask material 32 is removed, thereby forming a glass substrate 31 having a flat area 11a and the roughened area 11b.

<B-2: Second Manufacturing Method>

Next, referring to FIGS. 9A to 9F, the second manufacturing method for the liquid crystal display device of the first to the third embodiments will be described. Hereinafter, the case is also considered in which four backside substrates 11 are obtained from one glass substrate 31 as is the case in the first manufacturing method. In addition, the glass substrate 31 is a substrate composed of a soda lime glass.

Figure 9A:
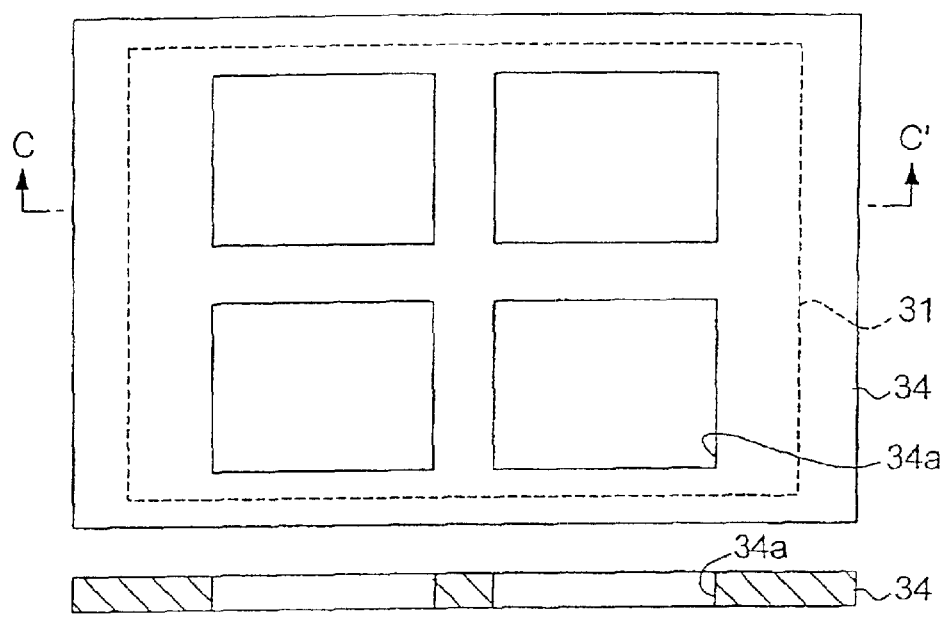
FIG. 9A is a plan view showing the state in which a stainless steel plate is disposed on a glass substrate in a second manufacturing method for a liquid crystal display device of the present invention.
Figure 9B:
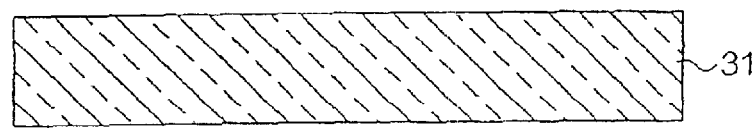
FIG. 9B is a cross-sectional view taken along the line C–C' in FIG. 9A.

First, as shown in FIGS. 9A and 9B, at one surface side of the glass substrate 31, a stainless steel plate 34 is disposed as a mask material. In the stainless steel plate 34, openings 34a are provided at areas corresponding to each roughened area 11b of the glass substrate 31.

Figure 9C:
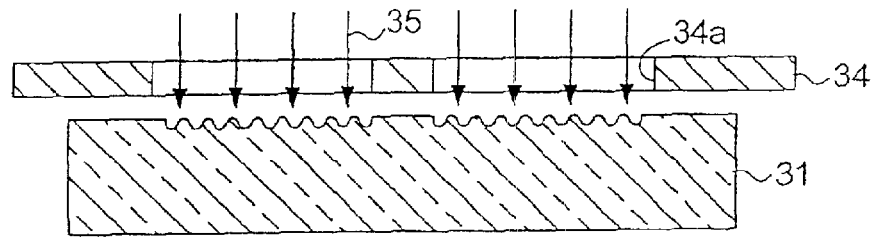
FIG. 9C is a cross-sectional view showing the state in which abrasive particles are blown to the surface of the glass substrate in the second manufacturing method.
Figure 9D:
FIG. 9D is a cross-sectional view showing the state in which a roughened area and a flat area are formed on the glass substrate in the second manufacturing method.
Figure 9E:
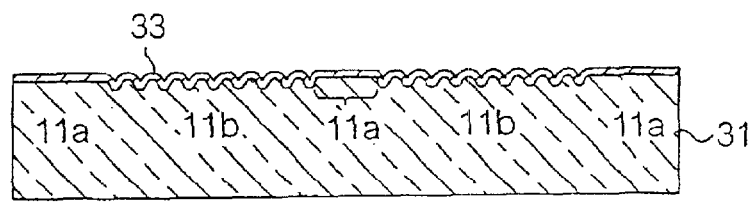
FIG. 9E is a cross-sectional view showing the state in which a metal film is formed on the glass substrate in the second manufacturing method.

Next, as shown in FIG. 9C, a number of fine abrasive particles 35 is blown to the surface of the glass substrate 31 via the stainless steel plate 34. In this step, in the areas on the surface of the glass substrate 31 corresponding to the openings 34a in the stainless steel plate 34, a number of recesses is formed by the bombardment of the abrasive particles 35. On the other hand, an area covered with the stainless steel plate 34 is not bombarded with the abrasive particles 35, and hence, the flat surface is maintained.

Subsequently, the glass substrate 31 is washed. That is, the abrasive particles 35 blown to the glass substrate 31 and powdered glass formed by the bombardment of the abrasive particles 35 are removed. The glass substrate 31 is then immersed in a predetermined treatment solution, whereby the entire surface of the glass substrate 31 is uniformly etched. As the predetermined treatment solution, for example, a treatment solution is used which is obtained by mixing one part by weight of hydrofluoric acid (50 wt %) and three parts by weight of an aqueous solution of ammonium fluoride (40 wt %).

Figure 9F:
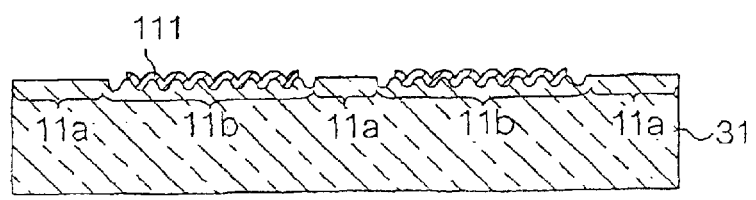
FIG. 9F is a cross-sectional view showing the state in which a reflective layer is formed on the glass substrate in the second manufacturing method.
Figure 11:
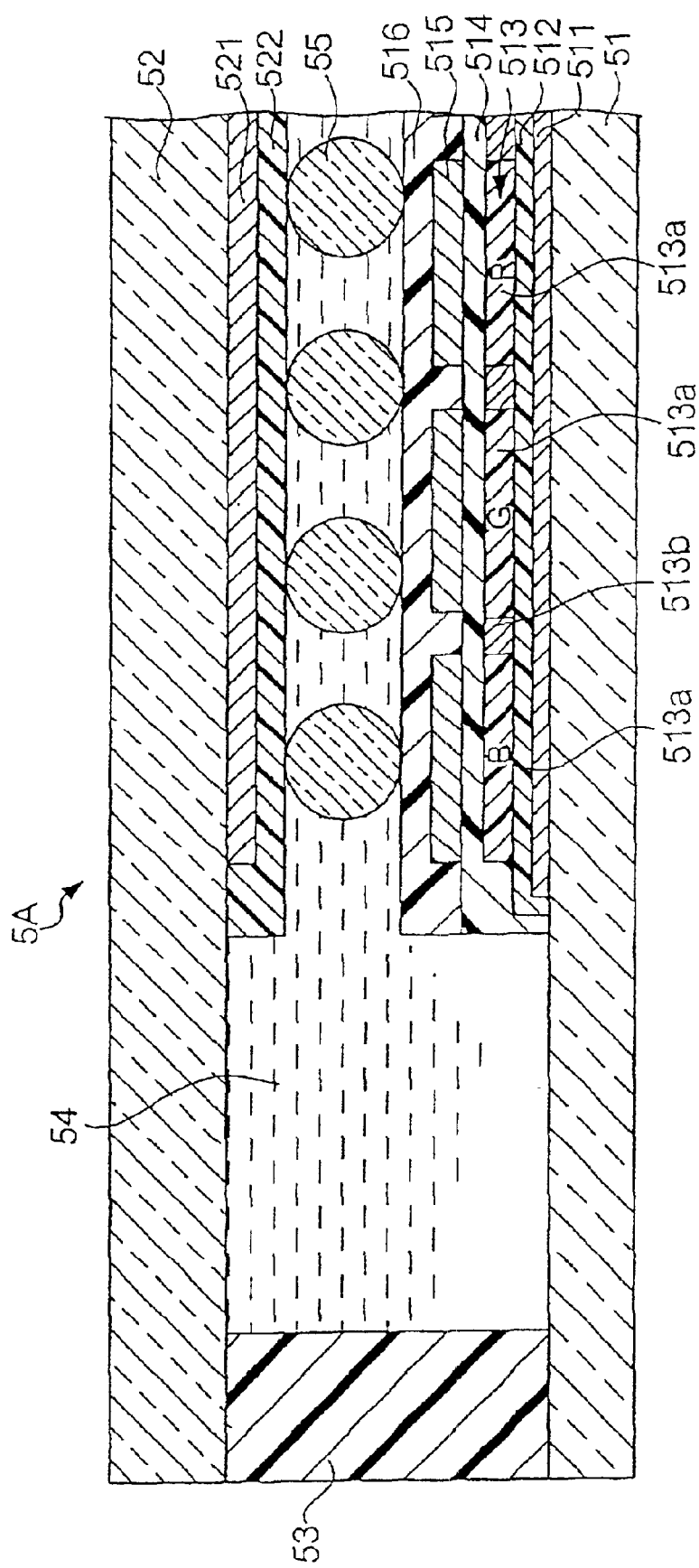
FIG. 11 is a cross-sectional view showing an example of the structure of a conventional reflective liquid crystal display device.
Figure 12:
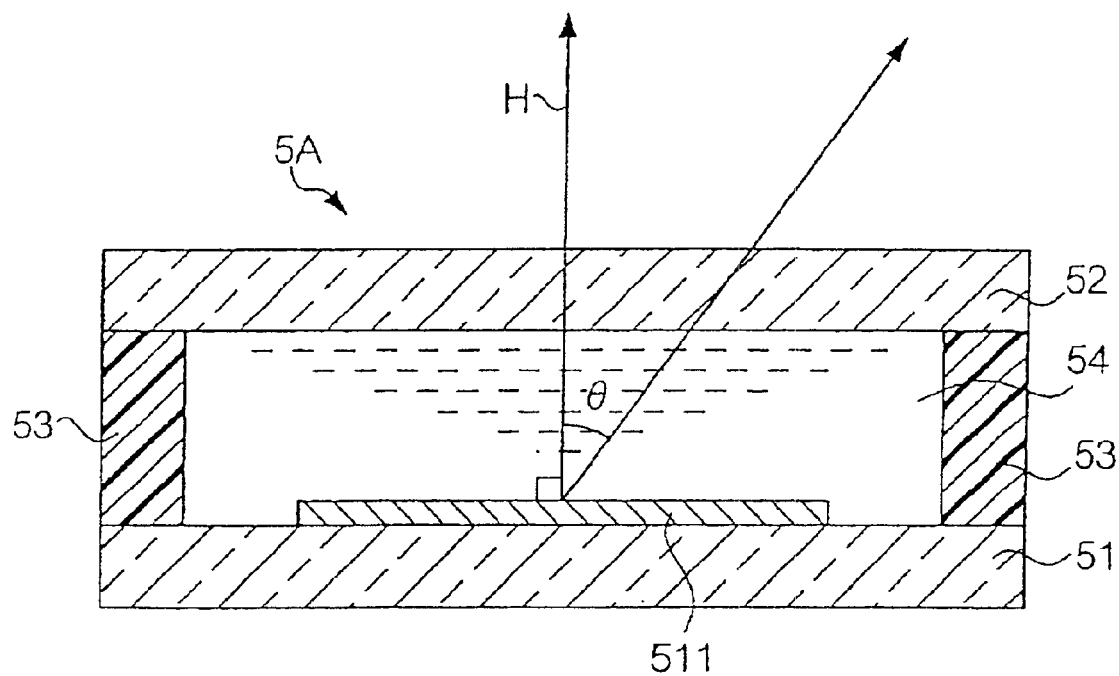
FIG. 12 is a view illustrating a problem of a conventional liquid crystal display device.
Figure 13:
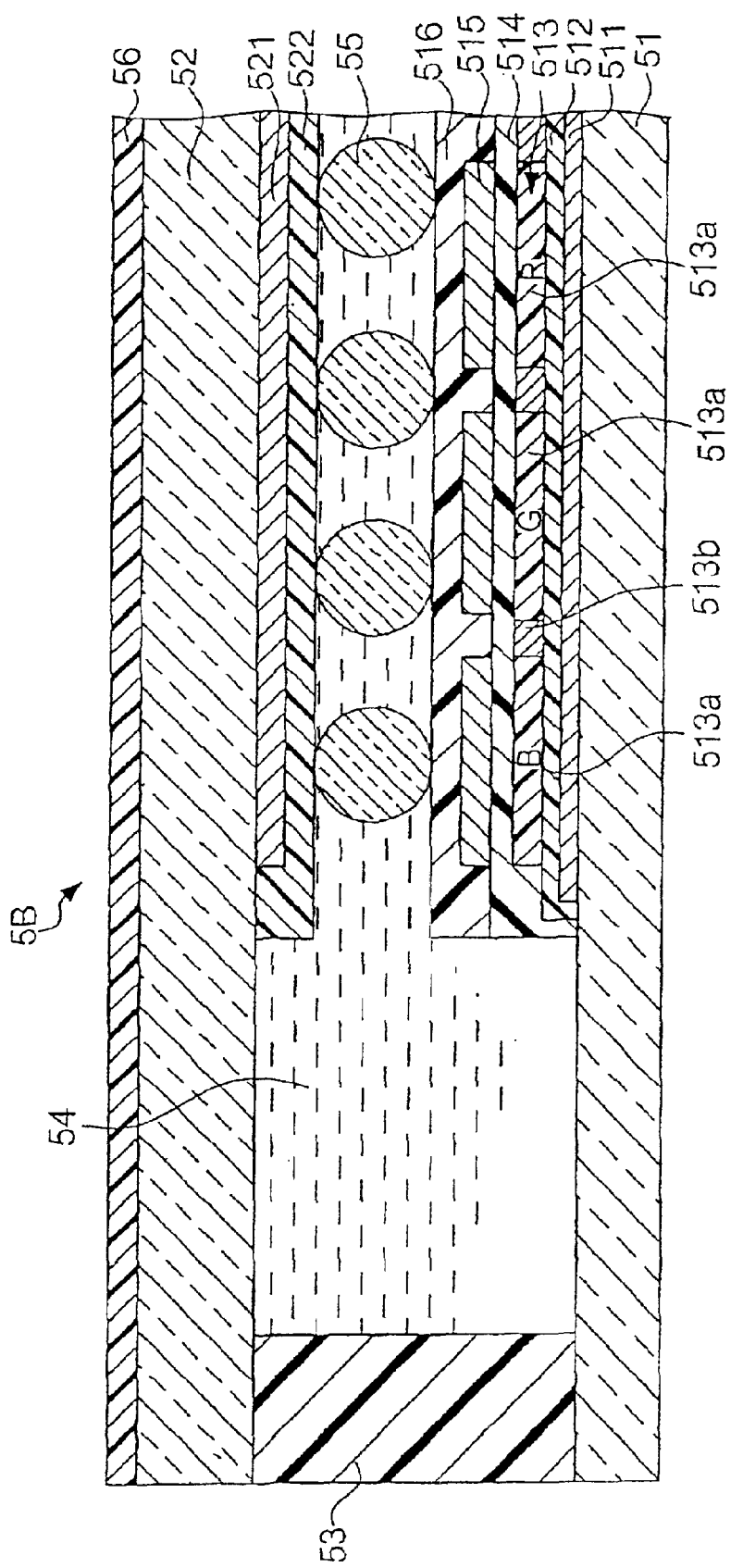
FIG. 13 is a cross-sectional view showing an example of the structure of a reflective liquid crystal display device using a conventional external scattering method.
Figure 14:
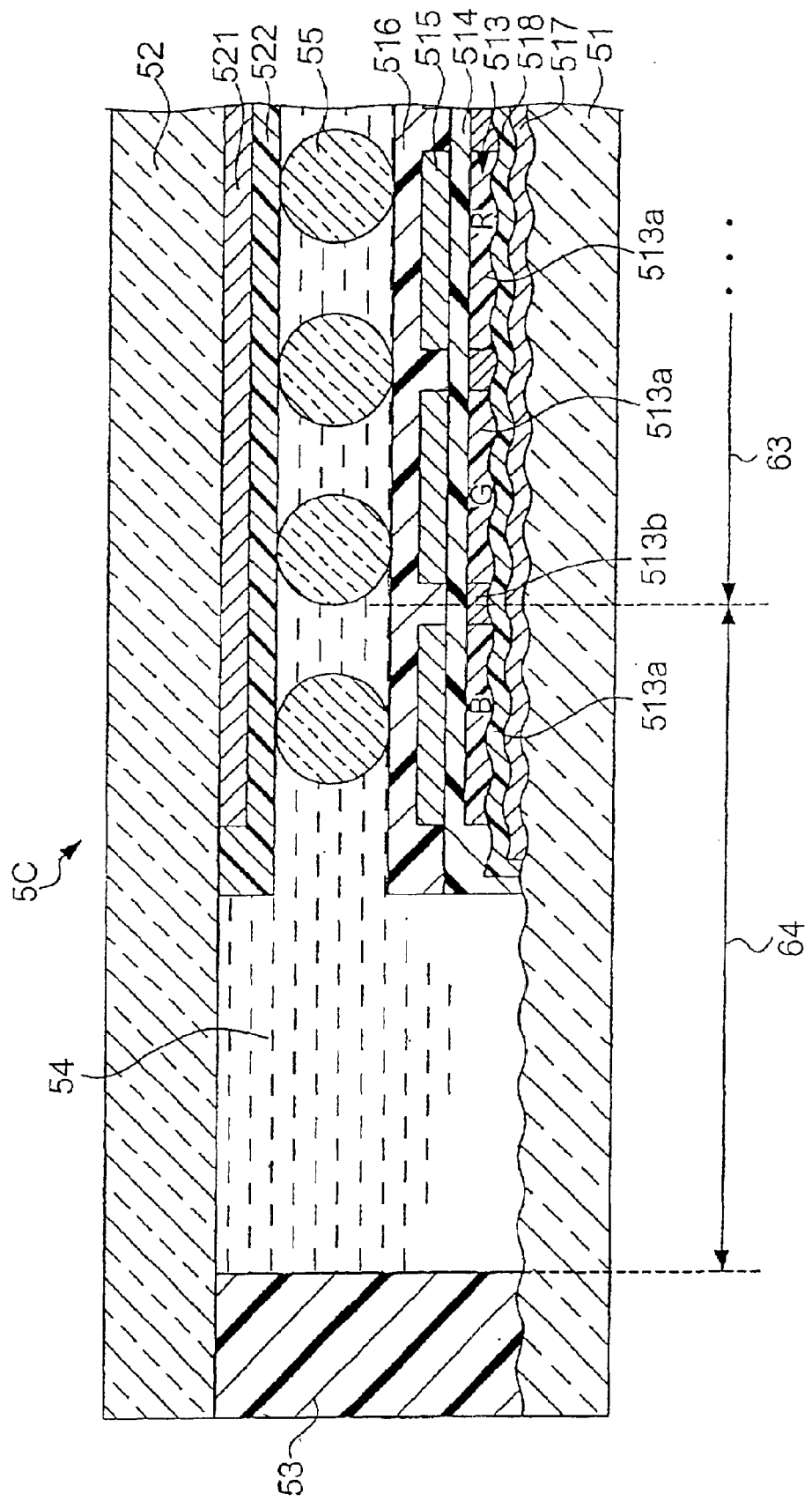
FIG. 14 is a cross-sectional view showing an example of the structure of a reflective liquid crystal display device using a conventional internal scattering method.
Figure 15:
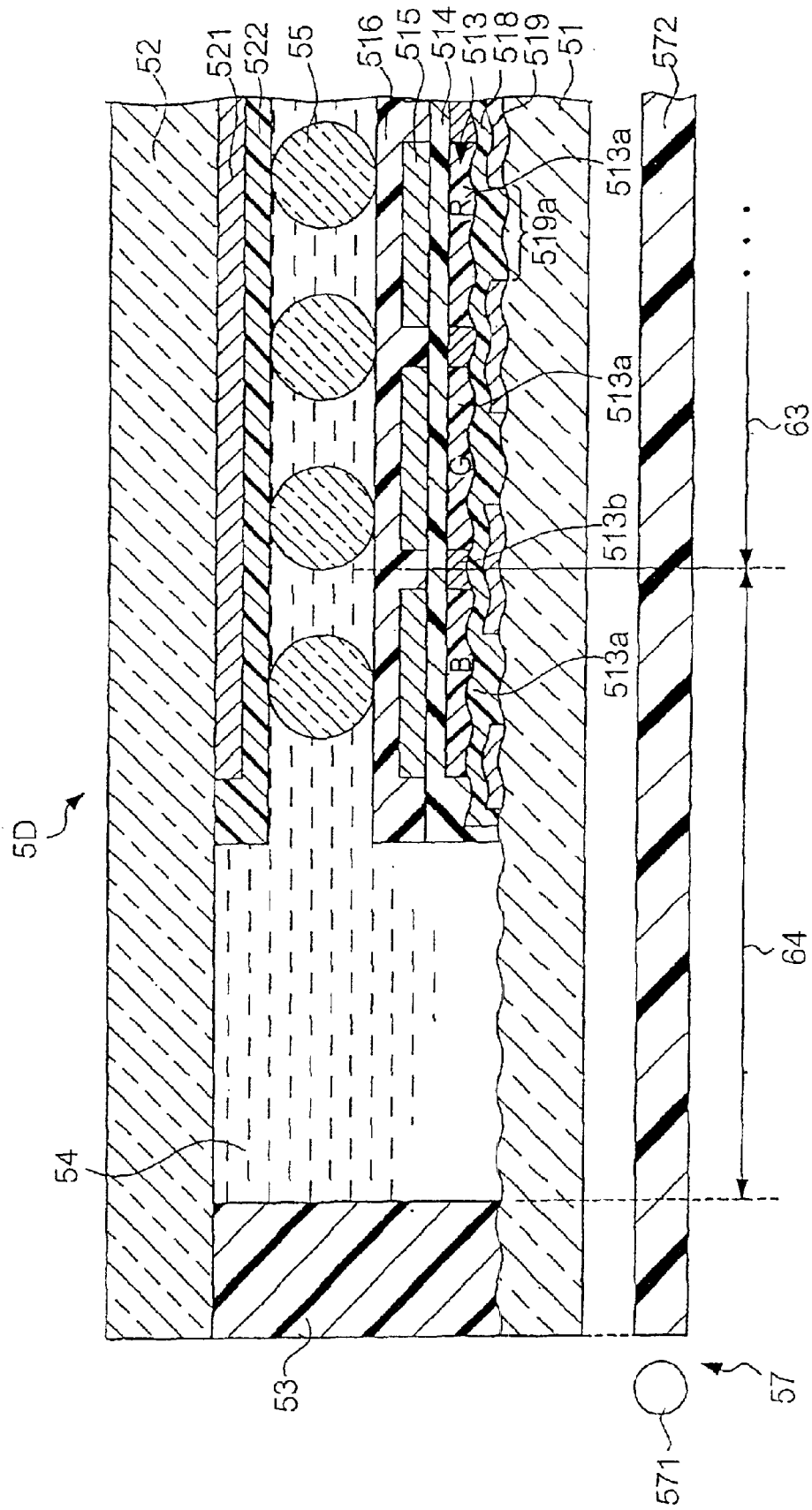
FIG. 15 is a cross-sectional view showing an example of the structure of a transflective liquid crystal display device using a conventional external scattering method.
Figure 16:
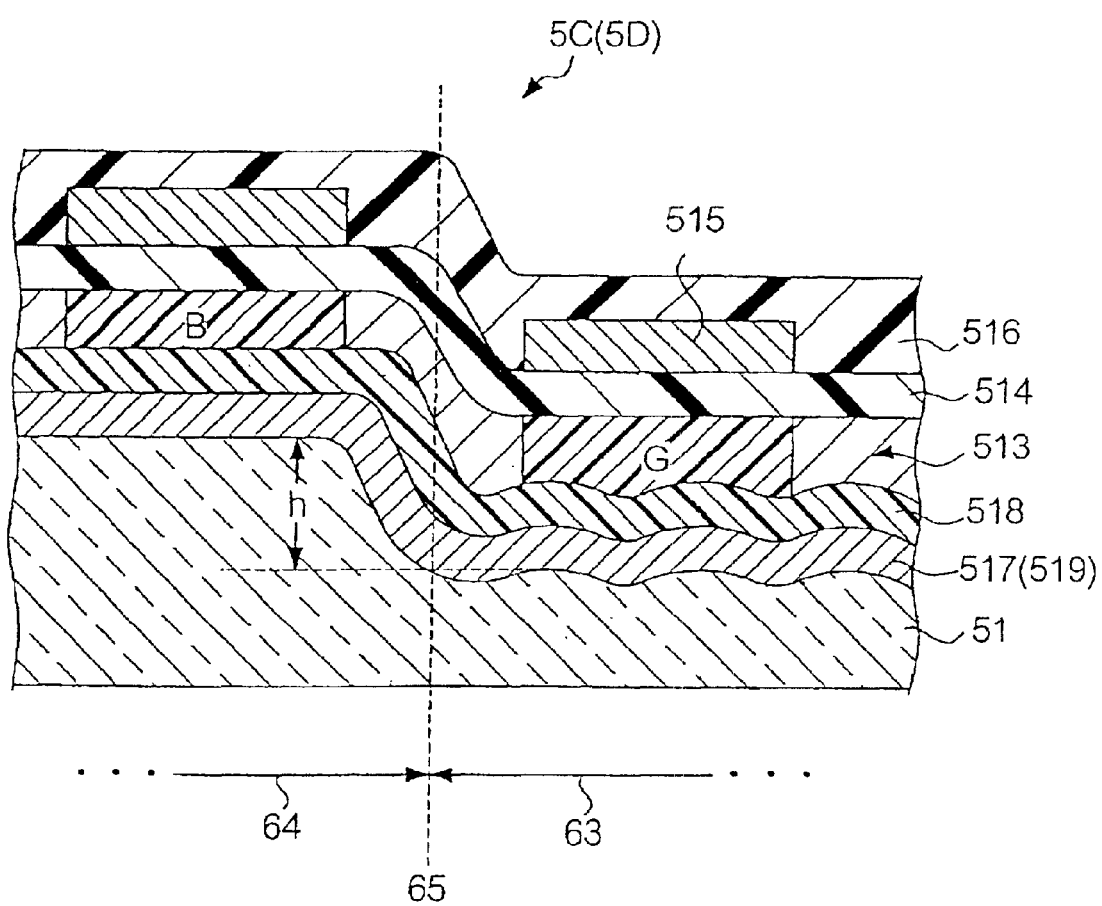
FIG. 16 is an exploded cross-sectional view showing an example of the structure of the boundary, formed between a display area and a non-display area, and the vicinity thereof in a reflective liquid crystal display device using a conventional internal scattering method.

By the treatments described above, as shown in FIG. 9D, a glass substrate 31 is obtained having a flat area 11a and the roughened area 11b which are selectively formed. Subsequently, as is the case of the first manufacturing method described above, as shown in FIG. 9E, a metal film 33 is formed on the glass substrate 31. Next, the metal film 33 is patterned, and as shown in FIG. 9F, a reflective layer 111 is formed. Subsequent steps are equivalent to those in the first manufacturing method described above.

In the first and the second manufacturing methods described above, the roughened area 11b can be formed in which the protrusions and the recesses are irregularly formed. That is, according to the first manufacturing method, the roughened area 11b is formed having the irregularity in conformity with the mesh texture 311, and according to the second manufacturing method, the roughened area 11b is formed having the irregularity in conformity with the bombardment of the abrasive particles 35. Since the reflective layer 111 (or the transflective layer 117) is formed on the irregularly roughened area 11b, superior scattering characteristics can be obtained. In addition, even though the roughened area 11b described above is formed on the surface of the glass substrate 31, the surface of the glass substrate 31 in the flat area 11a is flat. The sealing material 13 is formed on this flat area 11a, and hence, the backside substrate 11 and the sealing material 13 can be satisfactory bonded to each other.

<C: Electronic Apparatus>

Next, electronic apparatuses will be described which are provided with the liquid crystal display devices 1A to 1C described above by way of example.

FIG. 10A is a perspective view showing the structure of a mobile phone as an example of the electronic apparatuses. As shown in this figure, in the upper portion of the front surface of a mobile phone 41, a liquid crystal display device 411 is provided which serves as a display device.

FIG. 10B is a perspective view showing the structure of a portable information processing apparatus as an example of the electronic apparatuses. As shown in this figure, a portable information processing apparatus 42 comprises a body 423 having an input portion 422, such as a keyboard, and a liquid crystal display device 421 which serves as a display device.

FIG. 10C is a perspective view showing the structure of a wristwatch type electronic apparatus as an example of the electronic apparatuses. As shown in this figure, in a body 431 of a wristwatch type electronic apparatus 43, a liquid crystal display device 432 is provided which serves as a display device.

Since the electronic apparatuses shown in FIGS. 10A to 10C are each provided with the liquid crystal display device of the present invention, high quality display can be realized.

What is claimed is:

1. A liquid crystal display device comprising:
   a pair of glass substrates bonded to each other by a sealing material in the form of a frame provided therebetween;
   liquid crystal held between the pair of glass substrates;
   a reflective layer formed on one of the glass substrates at the liquid crystal side; and
   an alignment film formed over the reflective layer at the liquid crystal side;
   wherein a glass surface of said one of the glass substrates has a roughened area, the roughened area being recessed relative to a planar area of the surface;
   the alignment film is formed over the recessed roughened area; and
   the sealing material is formed over the planar area.

2. The liquid crystal display device according to claim 1, wherein a boundary of the roughened area and the planar area is located between an inside periphery of the sealing material and a periphery of the alignment film.

3. The liquid crystal display device according to claim 1, wherein the reflective layer has a plurality of apertures therein.

4. The liquid crystal display device according to claim 1, further comprising a color filter layer and a protective layer protecting the color filter, which are provided between the reflective layer and the alignment film and in the roughened area of said one of the glass substrates.

5. An electronic apparatus comprising a liquid crystal display device according to claim 1.

6. A liquid crystal display device comprising:
   a front glass substrate and a backside glass substrate bonded together by a sealing material;
   a liquid crystal disposed between said front and backside glass substrates;
   a first alignment film formed on a liquid crystal side of said front glass substrate;
   a second alignment film formed on a liquid crystal side of said glass backside substrate;
   a glass surface of said backside substrate is composed of a peripheral flat area that surrounds a roughened area, the roughened area being recessed relative to the peripheral flat area of the surface and containing a plurality of protrusions and recesses;

wherein said second alignment film is disposed within said roughened area that contains said plurality of protrusions and recesses and said sealing material is formed on said flat area; and a plurality of spacers dispersed between said first and second alignment films.

7. A liquid crystal display device according to claim 6, wherein a reflective layer, an insulating layer and a color filter layer are disposed on said backside glass substrate on said roughened area that contains said plurality of protrusions and recesses.

8. A liquid crystal display according to claim 7, wherein said reflective layer contains a plurality of apertures therein.

9. A liquid crystal display device according to claim 6, wherein a transflective layer, an insulating layer and a color filter layer are disposed on said backside glass substrate on said roughened area than contains said plurality of protrusions and recesses.

10. A liquid crystal display according to claim 9, wherein said transflective layer contains a plurality of apertures therein.

11. A liquid crystal display device according to claim 6, further comprising a light source.

12. A liquid crystal device comprising:

a liquid crystal disposed between a front glass substrate and a backside glass substrate;

a polarizer, a retardation plate, a plurality of pixel electrodes, a plurality of scanning lines, and a first alignment film disposed on said front glass substrate;

said backside glass substrate having a surface including peripheral planar area and a roughened area, the roughened area containing a plurality of protrusions and recesses, and the roughened area being recessed relative to the planar area of the surface;

a reflective layer, an insulating layer, a color filter layer, a protective layer, a plurality of transparent electrodes, and a second alignment film disposed on said roughened area containing a plurality of protrusions and recesses;

a sealing material disposed on said planar area of backside glass substrate; and a plurality of spacers disposed between said first and second alignment films.

13. A liquid crystal device comprising:

a glass substrate having a glass surface including a roughened portion inboard of a flat peripheral portion, the roughened portion being recessed relative to the flat peripheral portion;

a reflective layer formed on said roughened portion for reflecting incident light; and a sealing material disposed on said flat peripheral portion around said roughened portion.

14. A liquid crystal device comprising:

a pair of glass substrates opposing each other, one of said glass substrates having a roughened portion that is recessed relative to a planar surface of said glass substrate; and an alignment film disposed on said roughened portion spaced apart from the edges of said roughened portion.

15. A liquid crystal device according to claim 14 further comprising a reflecting layer disposed between said glass substrate having said roughened portion and said alignment film for reflecting incident light.

16. A liquid crystal device according to claim 14, wherein said planar surface is outboard of said edges of said roughened portion.

* * * * *